United States Patent
You et al.

(10) Patent No.: US 9,876,615 B2
(45) Date of Patent: Jan. 23, 2018

(54) METHOD AND APPARATUS FOR TRANSMITTING AND RECEIVING DATA MULTIPLE TIMES IN CONSECUTIVE SUBFRAMES

(71) Applicant: LG ELECTRONICS INC., Seoul (KR)

(72) Inventors: Hyangsun You, Anyang-si (KR); Joonkui Ahn, Anyang-si (KR); Yunjung Yi, Anyang-si (KR); Suckchel Yang, Anyang-si (KR); Bonghoe Kim, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/437,427

(22) PCT Filed: Nov. 13, 2013

(86) PCT No.: PCT/KR2013/010280
§ 371 (c)(1),
(2) Date: Apr. 21, 2015

(87) PCT Pub. No.: WO2014/077577
PCT Pub. Date: May 22, 2014

(65) Prior Publication Data
US 2015/0280876 A1    Oct. 1, 2015

Related U.S. Application Data

(60) Provisional application No. 61/808,643, filed on Apr. 5, 2013, provisional application No. 61/804,197, filed
(Continued)

(51) Int. Cl.
*H04L 1/18* (2006.01)
*H04L 5/00* (2006.01)
(Continued)

(52) U.S. Cl.
CPC .............. *H04L 1/1819* (2013.01); *H04L 1/08* (2013.01); *H04L 1/189* (2013.01); *H04L 1/1812* (2013.01);
(Continued)

(58) Field of Classification Search
CPC ... H04L 5/0048; H04L 5/0044; H04L 1/1819; H04L 1/1816; H04L 1/1812; H04L 1/08;
(Continued)

(56) References Cited

U.S. PATENT DOCUMENTS 6,512,758 B1 * 1/2003 Sato .......................... H04L 1/18
370/203
9,287,942 B2 * 3/2016 Kang ................... H04B 7/0404
(Continued)

FOREIGN PATENT DOCUMENTS

EP        2587704 A2    5/2013
WO    WO 2009/126902 A2    10/2009
(Continued)

OTHER PUBLICATIONS

China Telecom, "Potential Solutions for Uplink Coverage Enhancements", TSG-RAN WG1 #68, Dresden, Germany, Feb. 6-10, 2012, R1-120579, 5 pages.
(Continued)

*Primary Examiner* — Tejis Daya
(74) *Attorney, Agent, or Firm* — Birch, Stewart, Kolasch & Birch, LLP

(57) ABSTRACT

The present invention provides a method and apparatus for transmitting data and a method and apparatus for receiving data, wherein said methods transmit/receive a reference signal in sub-frames bundled for data transmission/reception using at least an identical precoding matrix, an identical
(Continued)

reference signal sequence, an identical reference signal generating identifier, or an identical reference signal scrambling sequence.

20 Claims, 16 Drawing Sheets

Related U.S. Application Data on Mar. 22, 2013, provisional application No. 61/752,444, filed on Jan. 14, 2013, provisional application No. 61/726,005, filed on Nov. 13, 2012.

(51) Int. Cl.
*H04L 27/26* (2006.01)
*H04L 1/08* (2006.01)
*H04L 5/14* (2006.01)

(52) U.S. Cl.
CPC .......... *H04L 1/1816* (2013.01); *H04L 5/0044* (2013.01); *H04L 5/0048* (2013.01); *H04L 5/0055* (2013.01); *H04L 5/0082* (2013.01); *H04L 27/2602* (2013.01); *H04L 27/2613* (2013.01); *H04L 5/001* (2013.01); *H04L 5/0023* (2013.01); *H04L 5/0035* (2013.01); *H04L 5/1469* (2013.01)

(58) Field of Classification Search
CPC . H04L 1/189; H04L 27/2613; H04L 27/2602; H04L 5/0055; H04L 5/0082; H04L 5/0035; H04L 5/1469; H04L 5/0023; H04L 5/001
See application file for complete search history.

(56) References Cited

U.S. PATENT DOCUMENTS

| | | | | |
|---|---|---|---|---|
| 9,496,940 | B2 * | 11/2016 | Einhaus | H04B 7/0639 |
| 2007/0177569 | A1 * | 8/2007 | Lundby | H04L 1/0017 370/349 |
| 2009/0122987 | A1 * | 5/2009 | Mo | H04L 1/1685 380/277 |
| 2009/0196204 | A1 * | 8/2009 | Astely | H04L 1/1635 370/280 |
| 2009/0257408 | A1 * | 10/2009 | Zhang | H04L 1/1621 370/336 |
| 2009/0316626 | A1 * | 12/2009 | Lee | H04L 1/1607 370/328 |
| 2010/0034139 | A1 * | 2/2010 | Love | H04L 1/0029 370/328 |
| 2010/0238877 | A1 * | 9/2010 | Nam | H04L 5/0048 370/329 |
| 2010/0309870 | A1 | 12/2010 | Wengerter et al. | |
| 2011/0077038 | A1 * | 3/2011 | Montojo | H04B 7/024 455/507 |
| 2011/0141952 | A1 * | 6/2011 | Wang | H04L 1/1812 370/294 |
| 2011/0154170 | A1 * | 6/2011 | Challa | H03M 13/6525 714/807 |
| 2011/0170504 | A1 * | 7/2011 | Xu | H04L 5/00 370/329 |
| 2011/0228731 | A1 * | 9/2011 | Luo | H01Q 3/2605 370/329 |
| 2011/0261746 | A1 * | 10/2011 | Seo | H04L 1/1812 370/315 |
| 2011/0310831 | A1 * | 12/2011 | Bhattad | H04B 7/0413 370/329 |
| 2011/0310856 | A1 * | 12/2011 | Hariharan | H04L 1/1607 370/336 |
| 2012/0002616 | A1 * | 1/2012 | Ishii | H04B 1/713 370/329 |
| 2012/0033571 | A1 * | 2/2012 | Shimezawa | H04B 7/026 370/252 |
| 2012/0057545 | A1 * | 3/2012 | Hariharan | H04L 1/1887 370/329 |
| 2012/0076078 | A1 * | 3/2012 | Han | H04L 1/06 370/328 |
| 2012/0087299 | A1 * | 4/2012 | Bhattad | H04L 5/0053 370/315 |
| 2012/0147830 | A1 * | 6/2012 | Lohr | H04W 72/042 370/329 |
| 2012/0176939 | A1 * | 7/2012 | Qu | H04L 5/0023 370/255 |
| 2012/0195271 | A1 * | 8/2012 | Lee | H04L 5/003 370/329 |
| 2013/0053077 | A1 * | 2/2013 | Barbieri | H04B 7/0626 455/509 |
| 2013/0279485 | A1 * | 10/2013 | Gao | H04L 9/065 370/336 |
| 2014/0247775 | A1 * | 9/2014 | Frenne | H04L 5/0048 370/329 |
| 2014/0286291 | A1 * | 9/2014 | Einhaus | H04B 7/024 370/329 |
| 2015/0280876 | A1 * | 10/2015 | You | H04L 5/0048 370/329 |

FOREIGN PATENT DOCUMENTS

| | | |
|---|---|---|
| WO | WO 2011/162541 A2 | 12/2011 |
| WO | WO 2012/109542 A1 | 8/2012 |

OTHER PUBLICATIONS

Intel Corporation, "Impact of ePDCCH on PDSCH PRB Bundling", 3GPP TSG RAN WG1 Meeting #68bis, Jeju, Korea, Mar. 26-30, 2012, R1-121536, 4 pages.

Renesas Mobile Europe LTD., "On the need of PHICH enhancements", 3GPP TSG-RAN WG1 Meeting #68, Dresden, Germany, Feb. 6-10, 2012, R1-120386, 8 pages.

3GPP, "Technical Specification Group Radio Access Network; Evolved Universal Terrestrial Radio Access (E-UTRA); Physical Channels and Modulation (Release 8)", 3GPP TS 36.211 V8.3.0, May 2008, pp. 1-77.

* cited by examiner

FIG. 5
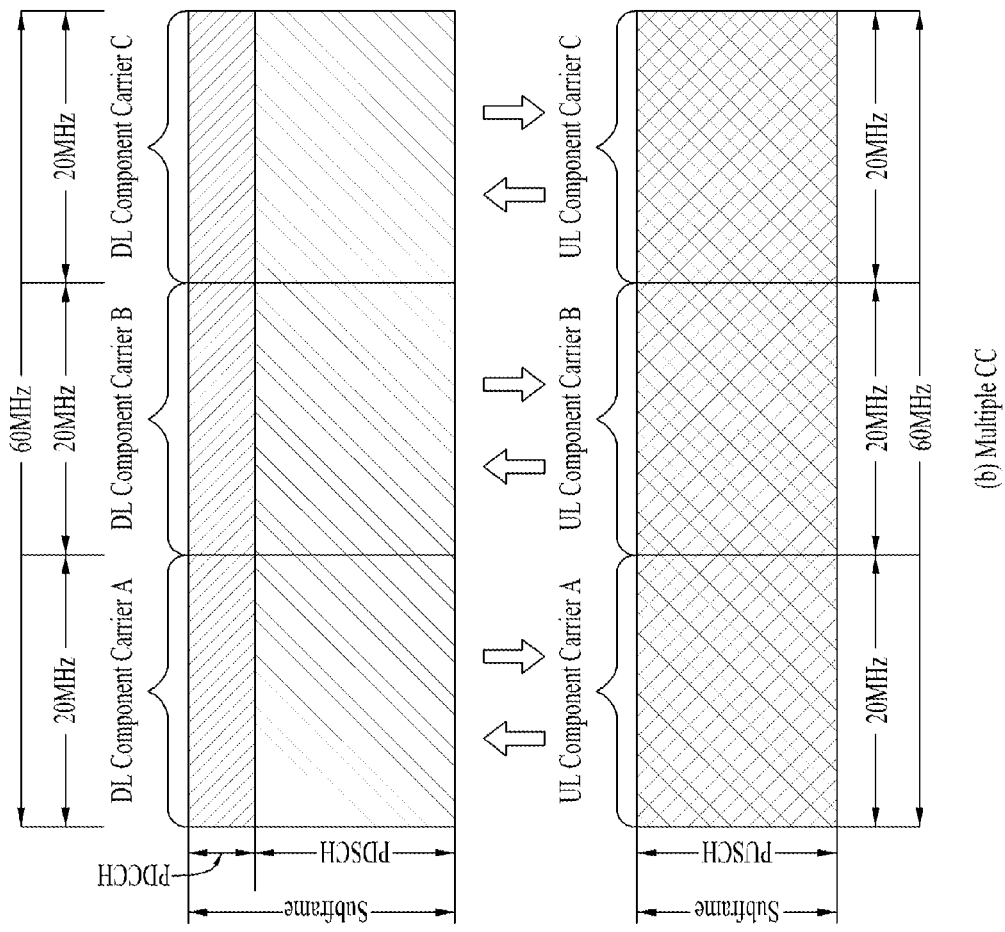
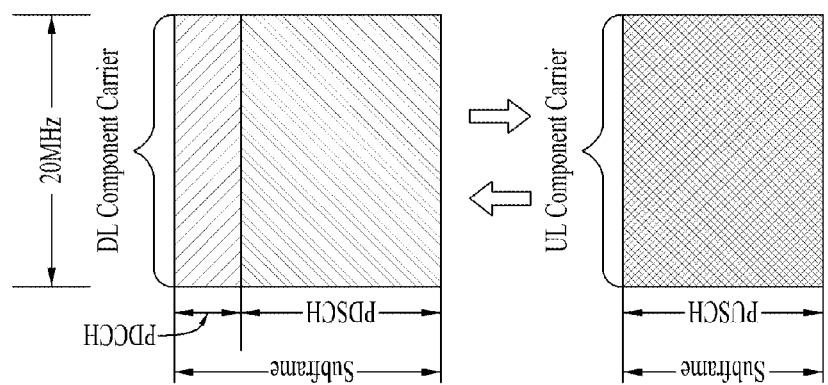

[p]  RE occupied by CRS of port p ( p∈0, p∈0,1 or p∈0,1,2,3 )

☐  RE occupied by UE-RS of port(s) p ( p∈7, p∈8, p∈7,8 or p∈7,8,11,13 )

☐  RE occupied by UE-RS of port(s) p ( p∈9, p∈10, p∈9,10 or p∈9,10,12,14 )

METHOD AND APPARATUS FOR TRANSMITTING AND RECEIVING DATA MULTIPLE TIMES IN CONSECUTIVE SUBFRAMES

CROSS REFERENCE TO RELATED APPLICATIONS

This application is the National Phase of PCT International Application No. PCT/KR2013/010280, filed on Nov. 13, 2013, which claims priority under 35 U.S.C. 119(e) to U.S. Provisional Application Nos. 61/726,005 filed on Nov. 13, 2012; 61/752,444 filed on Jan. 14, 2013; 61/804,197 filed on Mar. 22, 2013 and 61/808,643 filed on Apr. 5, 2013, all of which are hereby expressly incorporated by reference into the present application.

TECHNICAL FIELD

The present invention relates to a wireless communication system and, more particularly, to a method for receiving or transmitting data and an apparatus therefor.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

In addition, a method for efficiently transmitting/receiving, on a limited radio resource, a reference signal used when a control signal and/or a data signal transmitted by a transmitting device is restored by a receiving device is also demanded.

The technical objects that can be achieved through the present invention are not limited to what has been particularly described hereinabove and other technical objects not described herein will be more clearly understood by persons skilled in the art from the following detailed description.

Technical Solutions

The present invention provides a data transmission method and apparatus and a data reception method and apparatus, for transmitting/receiving a reference signal using the same precoding matrix, the same reference signal sequence, the same reference signal generation identity, and/or the same reference signal scrambling sequence in bundled subframes for data transmission/reception.

In an aspect of the present invention, provided herein is a method for transmitting data by a transmitting device, including transmitting the data and reference signals associated with the data in a bundled subframe set. The reference signals may have the same reference signal sequence over multiple subframes or a reference signal sequence generated at least using the same cell identity or the same scrambling. The reference signals may be precoded by the same precoding matrix and then transmitted in the respective subframes in the bundled subframe set.

In another aspect of the present invention, provided herein is a method for receiving data by a receiving device, including receiving the data and reference signals in a bundled subframe set; and decoding the data based on the reference signals. The reference signals may be received in respective multiple subframes of the bundled subframe set. The receiving device may assume that the same precoding matrix is applied to the reference signals over the multiple subframes. The receiving device may assume that the reference signals have the same reference signal sequence over the multiple subframes or a reference signal sequence generated at least using the same cell identity or the same scrambling.

In still another aspect of the present invention, provided herein is a data transmission device for transmitting data, including a radio frequency (RF) unit, and a processor configured to control the RF unit. The processor may control the RF unit to transmit the data and reference signals associated with the data in a bundled subframe set. The processor may generate the reference signals having the same reference signal sequence over multiple subframes in the bundled subframe set or having a reference signal sequence generated at least using the same cell identity or the same scrambling. The processor may precode the reference signals by the same precoding matrix over the multiple subframes and control the RF unit to transmit the precoded reference signals in the respective subframes.

In a further aspect of the present invention, provided herein is data reception device for receiving data, including a radio frequency (RF) unit, and a processor configured to control the RF unit. The processor may control the RF unit to receive the data and reference signals in a bundled subframe set and decode the data based on the reference signals. The processor may control the RF unit to receive the reference signals in respective multiple subframes of the bundled subframe set. The processor may assume that the same precoding matrix is applied to the reference signals over the multiple subframes. The processor may assume that the reference signals have the same reference signal sequence over the multiple subframes or a reference signal sequence generated at least using the same cell identity or the same scrambling.

In each aspect of the present invention, the reference signals may be transmitted or received in the same transport block in the multiple subframes.

In each aspect of the present invention, acknowledgement (ACK)/negative ACK (NACK) information for the data may be transmitted or received in a subframe n+4 corresponding to a fourth subframe after a last subframe n of the multiple subframes.

In each aspect of the present invention, if the acknowledgement (ACK)/negative ACK (NACK) information indicates NACK, the data may be retransmitted in a subframe n+13.

In each aspect of the present invention, the data may be transmitted or received in each of at least two subframes in the bundled subframe set using the same redundancy version.

The above technical solutions are merely some parts of the embodiments of the present invention and various embodiments into which the technical features of the present invention are incorporated can be derived and understood by persons skilled in the art from the following detailed description of the present invention.

Advantageous Effect

According to the present invention, uplink/downlink signals can be efficiently transmitted/received. Therefore, overall throughput of a wireless communication system is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWING

The accompanying drawings, which are included to provide a further understanding of the invention, illustrate embodiments of the invention and together with the description serve to explain the principle of the invention.

FIG. 5 is a diagram for explaining single-carrier communication and multi-carrier communication.

MODE FOR CARRYING OUT THE INVENTION

Figure 1:
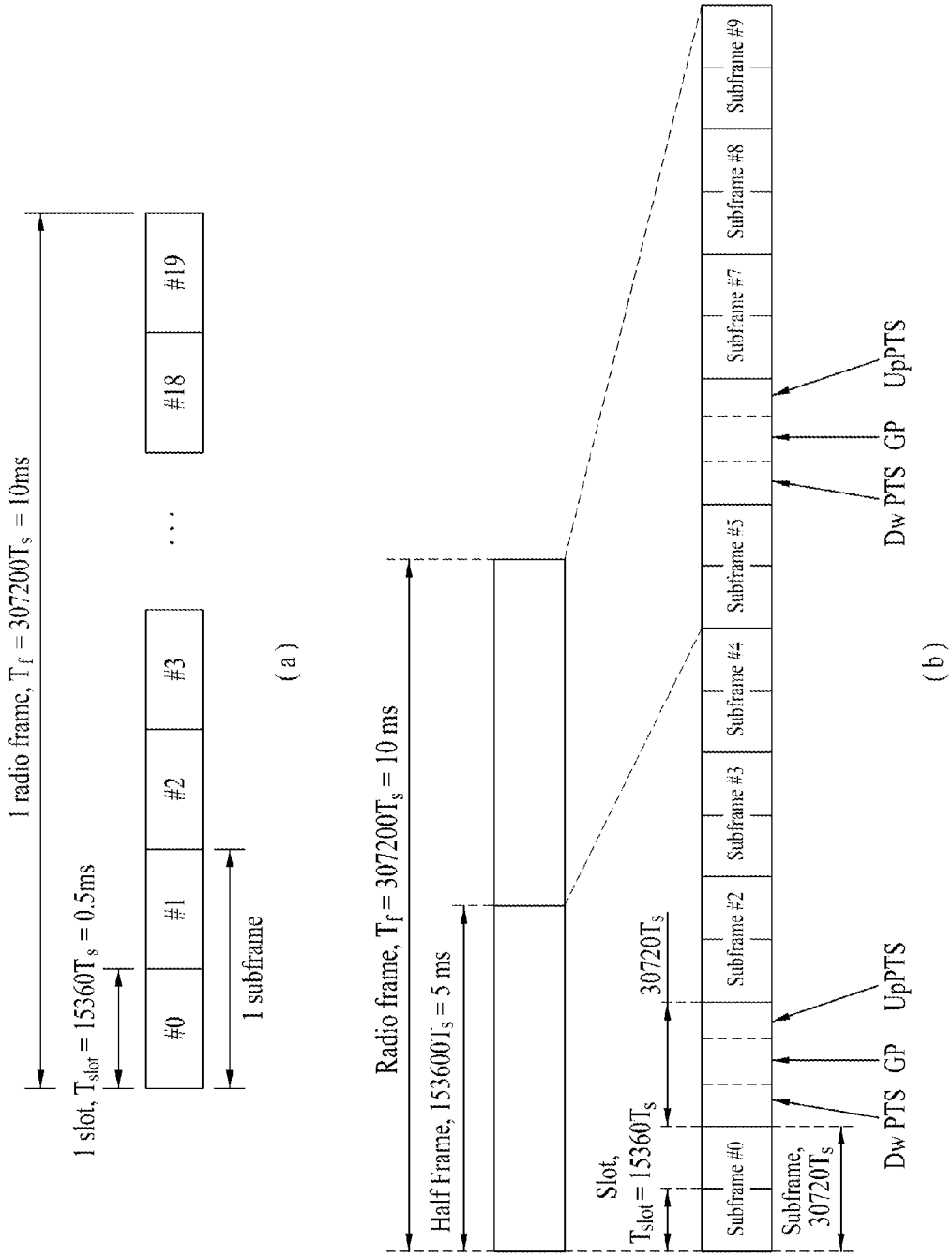
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the present invention. The same reference numbers will be used throughout this specification to refer to the same or like parts.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. MTC refers to exchange of information between a machine and an eNB without involving persons. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of a UE for MTC (hereinafter, MTC UE) according to data transmission rate. Since the MTC UE has low mobility, the channel environment thereof remains substantially the same.

Meanwhile, for a future wireless communication system, introducing a small cell having a smaller size, i.e. narrower node coverage, than an existing cell has been considered. The existing cell, coverage of which is wider than coverage of the small cell, is called a macro cell. Due to power or frequency characteristics of the small cell, the small cell provides services in a narrower range than a range in which the existing cell or a carrier can provide services. Since the small cell using low power can be easily deployed in indoor and outdoor hot spots, the small cell can be effectively used to handle explosive increase of communication traffic. A low-power node generally refers to a node having lower transmit power than transmit power of a macro node and a normal eNB. For example, a pico eNB and a femto eNB may be used as low-power nodes. If the small cell is used in the case in which a UE having low mobility requires high throughput, data transmission efficiency can be raised. Since coverage of the small cell is narrow, if a UE has high mobility, the UE needs to immediately leave the coverage of the small cell and be handed over to another cell. For this reason, using the small cell for a UE having very low mobility has been considered. Then, channel characteristics of the UE are not abruptly changed in the small cell and can be stably maintained.

A UE having low mobility, such as an MTC UE or a UE of a small cell, may be placed in a situation in which a channel is hardly changed while the UE receives data in multiple subframes. The present invention proposes a signal transmission/reception method and apparatus that are suitable for an environment in which a channel of the UE is hardly changed over time. Hereinafter, embodiments of the present invention will be described in detail.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmitting device determines whether another transmission is being performed before attempting to transmit traffic to a receiving device. In other words, the transmitting device attempts to detect presence of a carrier from another transmitting device before attempting to perform transmission. Upon sensing the carrier, the transmitting device waits for another transmission device which is performing transmission to finish transmission, before performing transmission thereof. Consequently, CSMA can be a communication scheme based on the principle of "sense before transmit" or "listen before talk". A scheme for avoiding collision between transmitting devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission and CSMA/CD is a scheme for flexibly transmitting data by monitoring collision. A transmitting device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality. of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will be described in detail when carrier aggregation is described.

GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In addition, in the present invention, PBCH/(e)PDCCH/PDSCH/PUCCH/PUSCH region refers to a time-frequency resource region to which PBCH/(e)PDCCH/PDSCH/PUCCH/PUSCH has been mapped or may be mapped.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/TRS symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe and a subframe in which a synchronization signal (e.g. PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the term CRS/UE-RS/CSI-RS/TRS ports may also be used to indicate a pattern of REs occupied by CRSs/UE-RSs/CSI-RSs/TRSs in a predetermined resource region. In the present invention, both a DMRS and a UE-RS refer to RSs for demodulation and, thus, each of the terms DMRS and UE-RS are used to refer to a demodulation RS.

FIG. 1 illustrates the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A.

Referring to FIG. 1, a 3GPP LTE/LTE-A radio frame is 10 ms ($307,200T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
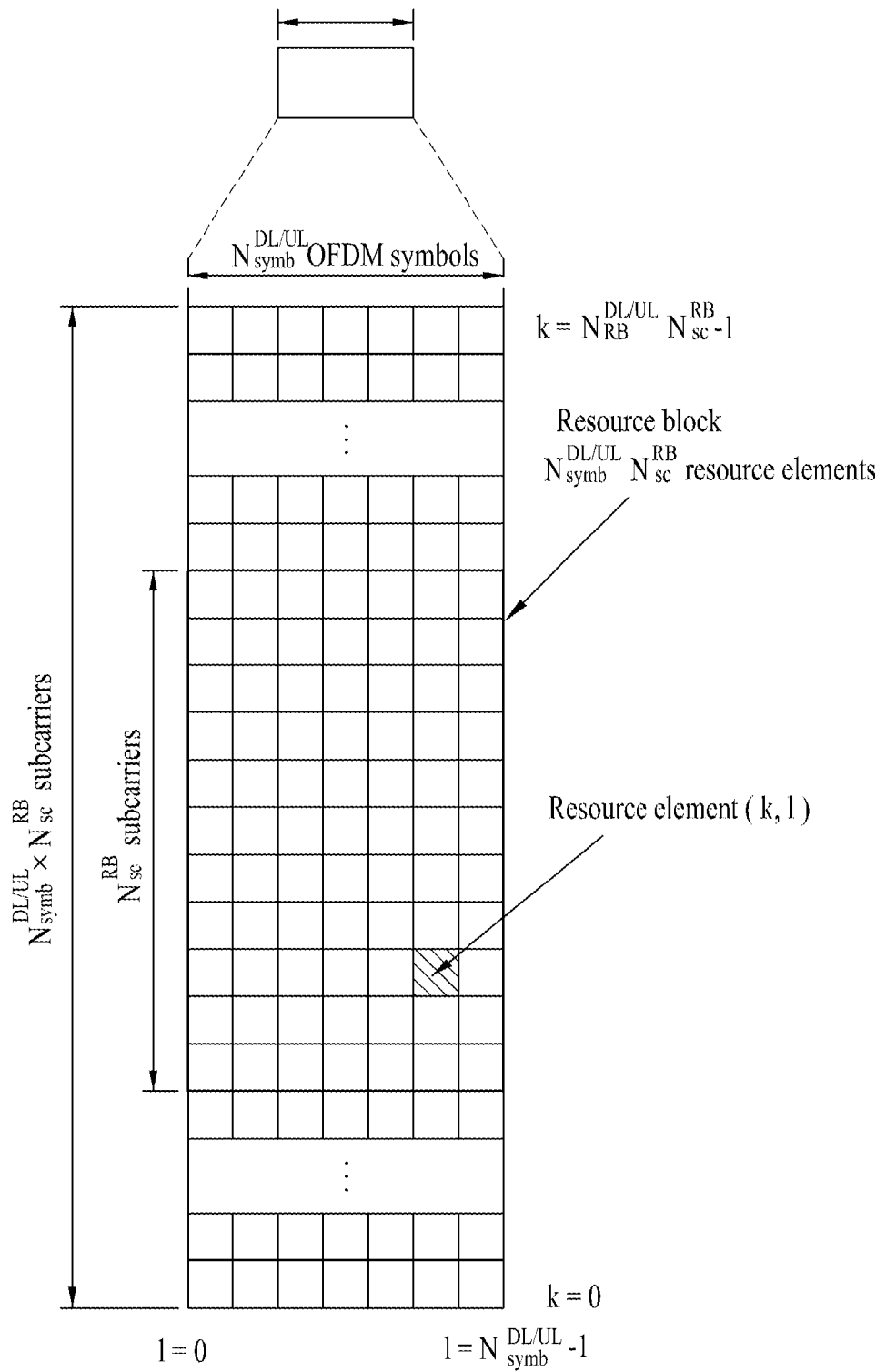
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
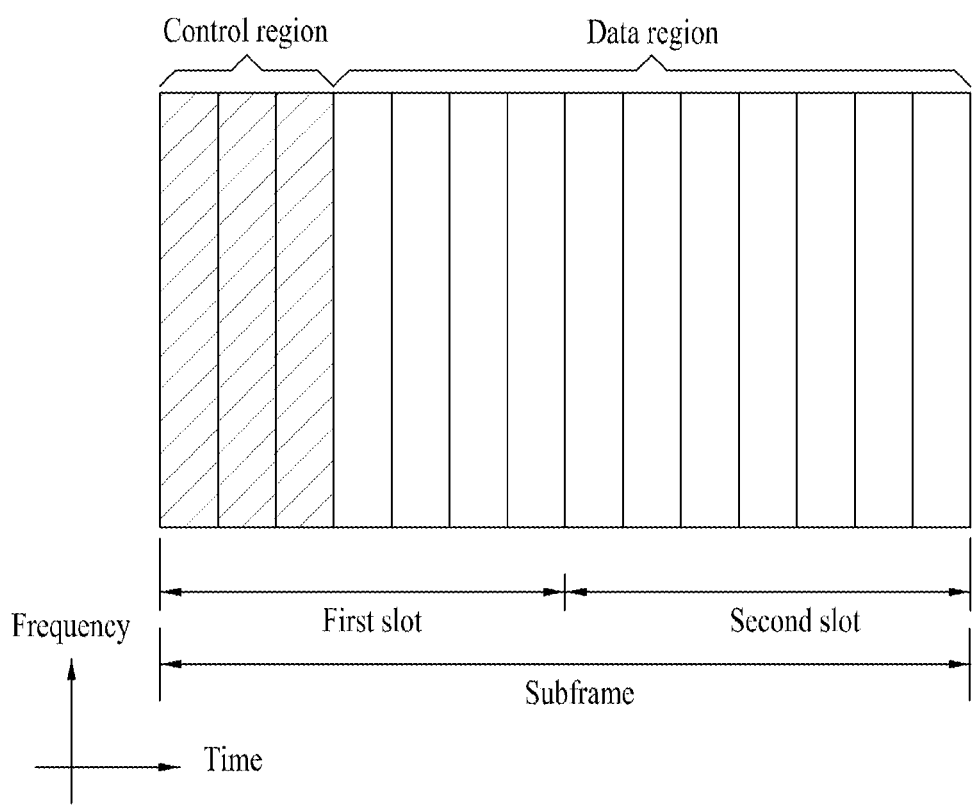
FIG. 3 illustrates the structure of a DL subframe used in a wireless communication system.

FIG. 3 illustrates the structure of a DL subframe used in a wireless communication system.

A DL subframe is divided into a control region and a data region in the time domain. Referring to FIG. 3, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 3 illustrates an example of the DCI format.

TABLE 3

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |

TABLE 3-continued

| DCI format | Description |
| --- | --- |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

In Table 3, formats 0 and 4 are DCI formats defined for UL and formats 1, 1A, 1B, 1C, 1D, 2, 2A, 2B, 2C, 3, and 3A are DCI formats defined for DL. Various DCI formats in addition to the formats shown in Table 6 may be defined.

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). For example, the PCFICH and PHICH include 4 REGs and 3 REGs, respectively. Assuming that the number of REGs not allocated to the PCFICH or the PHICH is $N_{REG}$, the number of available CCEs in a DL subframe for PDCCH(s) in a system is numbered from 0 to $N_{CCE}-1$ where $N_{CCE}=\text{floor}(N_{REG}/9)$.

A PDCCH format and the number of DCI bits are determined in accordance with the number of CCEs. The CCEs are numbered and consecutively used. To simplify the decoding process, a PDCCH having a format including n CCEs may be initiated only on CCEs assigned numbers corresponding to multiples of n. For example, a PDCCH including n consecutive CCEs may be initiated only on CCEs satisfying 'i mod n=0'. Herein, i denotes a CCE index (or a CCE number).

The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS (USS) and is configured for each individual UE. The common SS (CSS) is configured for a plurality of UEs.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Figure 4:
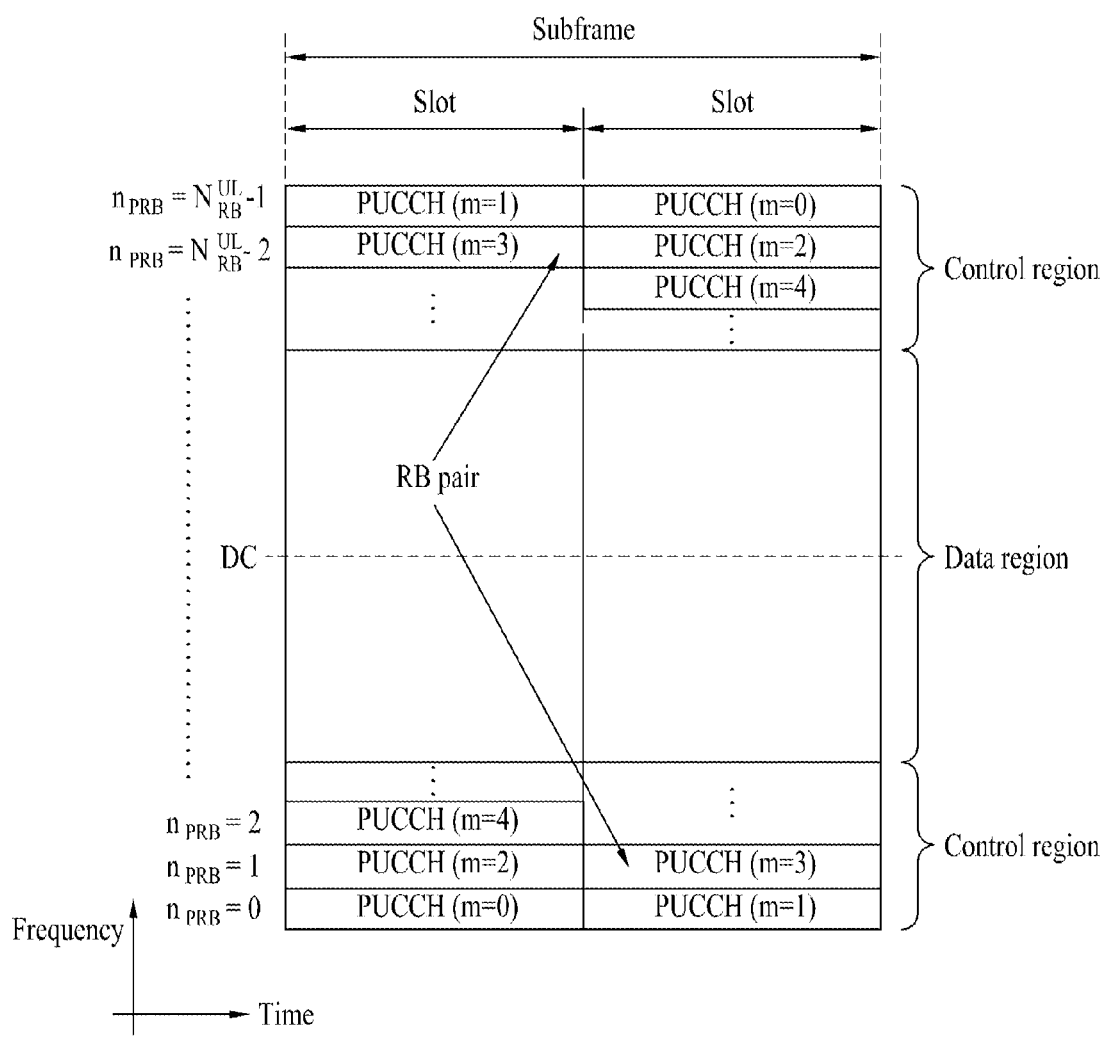
FIG. 4 illustrates the structure of a UL subframe used in a wireless communication system.

FIG. 4 illustrates the structure of a UL subframe used in a wireless communication system.

Referring to FIG. 4, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency fo in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

If a UE uses a single carrier frequency division multiple access (SC-FDMA) scheme in UL transmission, a PUCCH and a PUSCH cannot be simultaneously transmitted on one carrier in a 3GPP LTE release-8 or release-9 system in order to maintain a single carrier property. In a 3GPP LTE release-10 system, support/non-support of simultaneous transmission of the PUCCH and the PUSCH may be indicated by higher layers.

The present invention may be applied to multi-carrier communication as well as single carrier communication.

FIG. 5 is a diagram for explaining single-carrier communication and multi-carrier communication. Specially, FIG. 5(a) illustrates a subframe structure of a single carrier and FIG. 5(b) illustrates a subframe structure of multiple carriers.

A general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinbelow, each of carriers aggregated by carrier aggregation will be referred to as a component carrier (CC). For example, three 20 MHz CCs in each of UL and DL are aggregated to support a BW of 60 MHz. The CCs may be contiguous or non-contiguous in the frequency domain. Although a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The cell is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (PCell) or PCC, and a cell operating on a secondary frequency may be referred to as a secondary cell (SCell) or SCC. The carrier corresponding to the PCell on downlink will be referred to as a downlink primary CC (DL PCC), and the carrier corresponding to the PCell on uplink will be referred to as an uplink primary CC (UL PCC). A SCell means a cell that may be configured after completion of radio resource control (RRC) connection establishment and used to provide additional radio resources. The SCell may form a set of serving cells for the UE together with the PCell in accordance with capabilities of the UE. The carrier corresponding to the SCell on the downlink will be referred to as downlink secondary CC (DL SCC), and the carrier corresponding to the SCell on the uplink will be referred to as uplink secondary CC (UL SCC). Although the UE is in RRC-CONNECTED state, if it is not configured by carrier aggregation or does not support carrier aggregation, a single serving cell configured by the PCell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is full reconfigured will be referred to as PCell, and a cell which may be activated/deactivated freely by the eNB will be referred to as SCell. The PCell and the SCell may be identified from each other on the basis of the control information. For example, specific control information may be set to be transmitted and received through a specific cell only. This specific cell may be referred to as the PCell, and the other cell(s) may be referred to as SCell(s).

Among cells of the eNB, a cell in which carrier aggregation has been performed for the UE based on measurement reporting from another eNB or the UE is referred to as a configured cell or a serving cell. The serving cell is configured per UE.

The configured cell for the UE may be a serving cell in terms of the UE. The configured cell for the UE, i.e. the serving cell, prereserves resources for ACK/NACK transmission for PDSCH transmission. An activated cell refers to a cell configured to be actually used for PDSCH/PUSCH transmission among configured cells for the UE and CSI reporting and SRS transmission for PDSCH/PUSCH transmission are performed on the activated cell. A deactivated cell refers to a cell configured not to be used for PDSCH/PUSCH transmission by the command of an eNB or the operation of a timer and CSI reporting and SRS transmission are stopped on the deactivated cell. In order to distinguish between serving cell(s), serving cell indexes may be used. For example, any one of integers from 0 to ' maximum number of carrier frequencies which can be configured for the UE at a time minus 1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term cell used in CA is distinguished from the term cell referring to a prescribed geographic region to which a communication service is provided by one eNB or one antenna group. To distinguish between a cell indicating a prescribed geographic region and a cell of CA, in the present invention, the cell of CA is referred to as a CC and the cell of a geographic region is referred to as a cell.

In a CA situation, a plurality of serving CCs may be configured for one UE. A scheme performed by a control channel for scheduling a data channel can be divided into existing linked carrier scheduling and cross carrier scheduling. In link carrier scheduling, a control channel transmitted on a specific CC schedules only a data channel which is to be transmitted or received on the specific CC. In contrast, in cross carrier scheduling, a serving CC having a good channel state may be used to transmit a UL/DL grant for another serving CC. In cross carrier scheduling, a CC on which a UL/DL grant which is scheduling information is transmitted may be different from a CC on which UL/DL transmission corresponding to the UL/DL grant is performed. In cross carrier scheduling, a control channel schedules, using a carrier indicator field (CIF) in DCI, a data channel transmitted on a CC different from a CC on which a PDCCH carrying the DCI is configured.

For reference, the CIF is included in DCI and, in carrier aggregation, the CIF is used to indicate for which cell the DCI carries scheduling information. The eNB may inform a UE of whether the DCI which is to be received by the UE can include the CIF through a higher layer signal. That is, the UE may be configured with the CIF by a higher layer.

When cross carrier scheduling (also referred to as cross-CC scheduling) is applied, a PDCCH for DL assignment may be transmitted on, for example, DL CC#0 and a PDSCH corresponding to the PDCCH may be transmitted on, for example, DL CC#2. Whether a CIF is present in the PDCCH may be configured semi-statically and UE-specifically (or UE group-specifically) by higher layer signaling (e.g. RRC signaling).

The present invention may be applied to an EPDCCH, a PUSCH, a PDSCH scheduled by the EPDCCH, and/or a PUSCH, as well as a PDCCH, a PUCCH, a PDSCH scheduled by the PDCCH, and/or a PUSCH.

Figure 6:
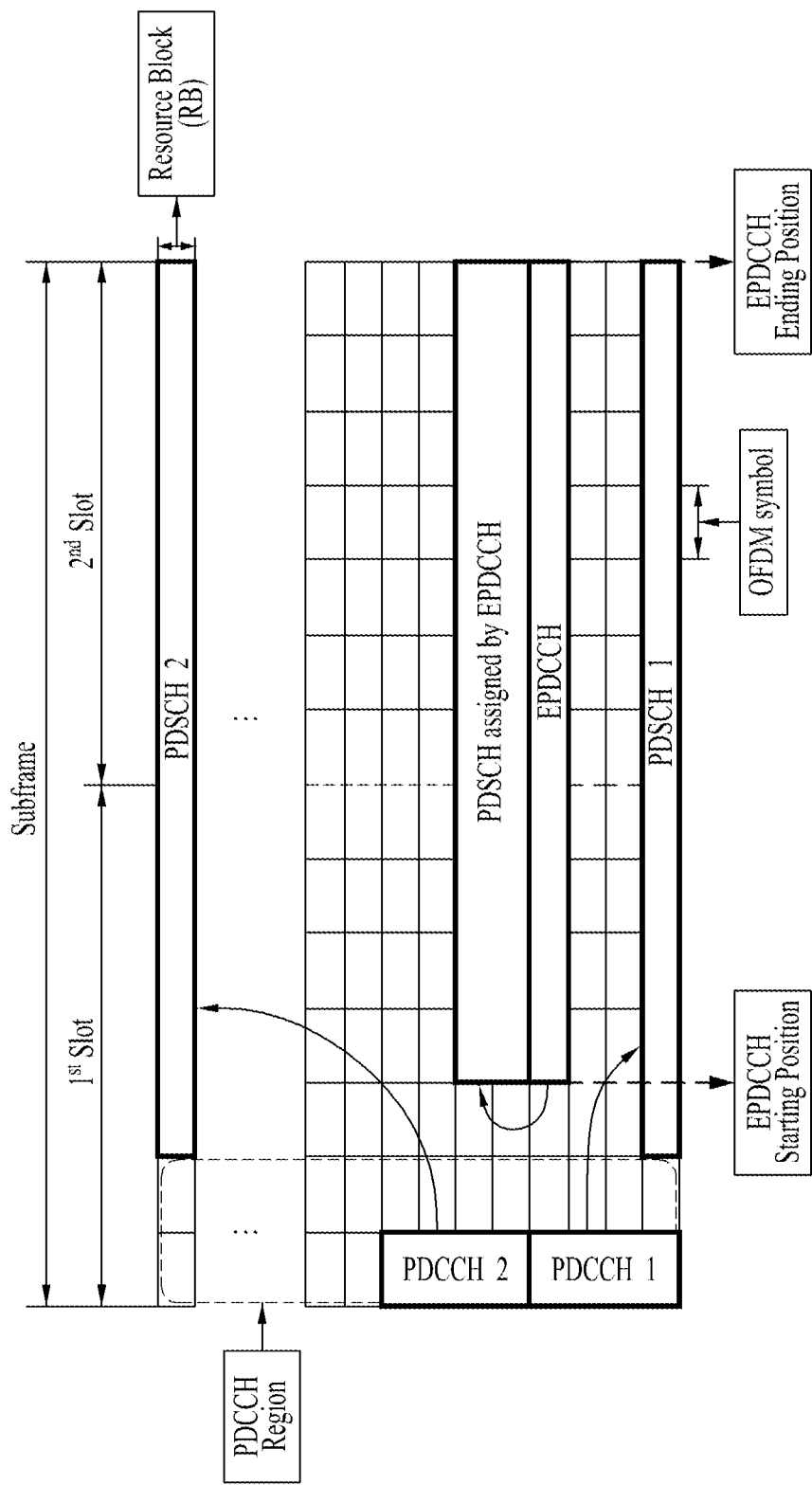
FIG. 6 illustrates a physical downlink control channel (PDCCH) or an enhanced PDCCH (EPDCCH), and a data channel scheduled by PDCCH/EPDCCH.

FIG. 6 illustrates a physical downlink control channel (PDCCH) or an enhanced PDCCH (EPDCCH), and a data channel scheduled by PDCCH/EPDCCH. Particularly, FIG. 6 illustrates the case in which the EPDCCH is configured by spanning the fourth symbol (OFDM symbol #3) to the last symbol of a subframe. The EPDCCH may be configured using consecutive frequency resources or may be configured using discontinuous frequency resources for frequency diversity.

Referring to FIG. 6, PDCCH 1 and PDCCH 2 may schedule PDSCH 1 and PDSCH 2, respectively, and the EPDCCH may schedule another PDSCH. Similarly to the case of a PDCCH, specific resource assignment units may be defined for the EPDCCH and the EPDCCH may be configured by a combination of the defined specific resource assignment units. When the specific resource assignment units are used, there is an advantage of enabling execution of link adaptation because less resource assignment units can be used to configure the EPDCCH in the case of a good channel state and more resource assignment units can be used to configure the EPDCCH in the case of a poor channel state. Hereinafter, in order to distinguish a basic unit of the EPDCCH from a CCE which is a basic unit of the PDCCH, the basic unit of the EPDCCH will be referred to as an enhanced CCE (ECCE). It is assumed hereinafter that, for an aggregation level L of the EPDCCH, the EPDCCH is transmitted on an aggregation of L ECCEs. Namely, like the aggregation level of the PDCCH, the aggregation level of the EPDCCH also refers to the number of ECCEs used for transmission of one DCI. Hereinafter, an aggregation of ECCEs on which the UE is capable of detecting the EPDCCH thereof will be referred to as an EPDCCH search space. DCI carried by the EPDCCH is mapped to a single layer and precoded.

The ECCEs constituting the EPDCCH may be categorized into a localized ECCE (hereinafter, L-ECCE) and a distributed ECCE (hereinafter, D-ECCE) according to a scheme of mapping the ECCE(s) to RE(s). The L-CCE means that REs constituting an ECCE are extracted from the same PRB pair. If the EPDCCH is configured using L-ECCE(s), beamforming optimized for each UE can be performed. On the other hand, the D-ECCE corresponds to the case in which REs constituting the ECCE are extracted from different PRB pairs. Unlike the L-ECCE, the D-ECCE can acquire frequency diversity in spite of a restriction on beamforming. In localized mapping, a single antenna port $p \in \{107,108,109,110\}$ used for EPDCCH transmission is a function of index(es) of the ECCE for defining the EPDCCH. In distributed mapping, REs in an EREG are associated in a manner of alternating with one of two antenna ports.

Figure 7:
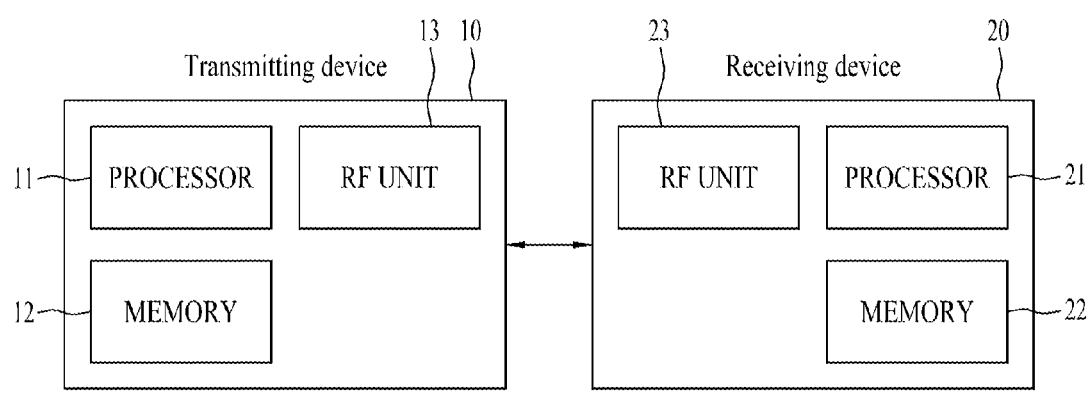
FIG. 7 is a block diagram illustrating elements of a transmitting device 10 and a receiving device 20 for implementing the present invention.

FIG. 7 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into $N_{layer}$ layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

Figure 8:
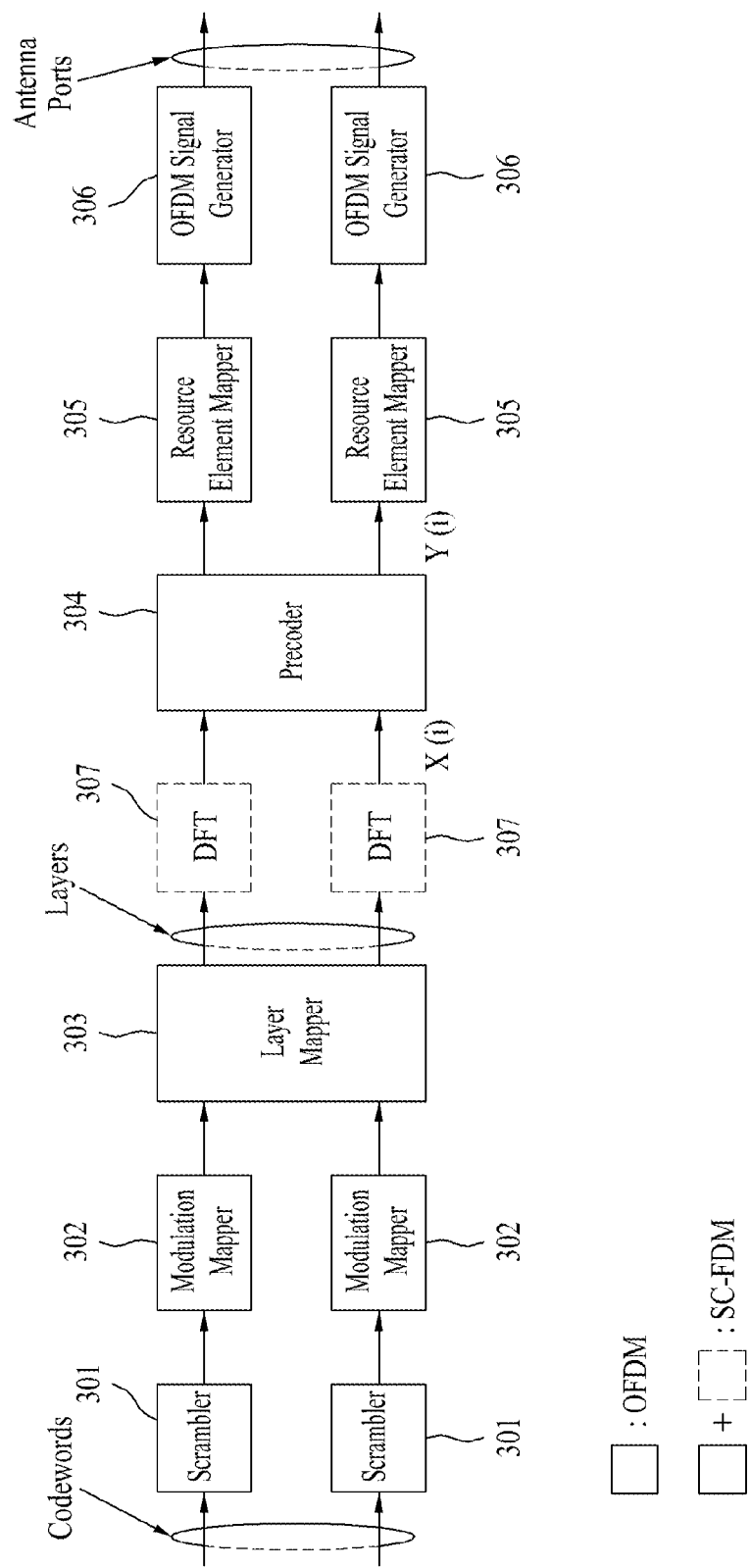
FIG. 8 illustrates an overview of physical channel processing.

FIG. 8 illustrates an overview of physical channel processing. A baseband signal representing a PUSCH or a PDSCH may be defined by a processing procedure of FIG. 8.

Referring to FIG. 8, a transmitting device may include scramblers 301, modulation mappers 302, a layer mapper 303, a precoder 304, RE mappers 305, and OFDM signal generators 306.

The transmitting device 10 may transmit more than one codeword. The scramblers 301 scramble the coded bits of each codeword, for transmission on a physical channel.

The modulation mappers 302 modulate the scrambled bits, thus producing complex-valued modulation symbols. The modulation mappers 302 modulate the scrambled bits to complex-valued modulation symbols representing positions on a signal constellation in a predetermined modulation scheme. The modulation scheme may be, but not limited to, any of m-phase shift keying (m-PSK) and m-quadrature amplitude modulation (m-QAM).

The layer mapper 303 maps the complex-valued modulation symbols to one or several transmission layers.

The precoder 304 may precode the complex-valued modulation symbols on each layer, for transmission through the antenna ports. More specifically, the precoder 304 generates antenna-specific symbols by processing the complex-valued modulation symbols for multiple transmission antennas in a MIMO scheme, and distributes the antenna-specific symbols to the RE mappers 305. That is, the precoder 304 maps the transmission layers to the antenna ports. The precoder 304 may multiply an output x of the layer mapper 303 by an $N_t \times M_t$ precoding matrix W and output the resulting product in the form of an $N_t \times M_F$ matrix z. Here, $N_t$ is corresponding to the number of transmission antennas, and $M_t$ is corresponding the number of layers. Since the precoder 304 is differently configured according to the precoding matrix, if the same precoding matrix is applied to signals, this indicates that the same precoder is applied to signals in the present invention and if different precoding matrices are applied to signals, this indicates that different precoders are applied to signals in the present invention.

The RE mappers 305 map/allocate the complex-valued modulation symbols for the respective antenna ports to REs. The RE mappers 305 may allocate the complex-valued modulation symbols for the respective antenna ports to appropriate subcarriers, and may multiplex them according to UEs.

The OFDM signal generators 306 modulate the complex-valued modulation symbols for the respective antenna ports, that is, the antenna-specific symbols through OFDM or SC-FDM modulation, thereby producing a complex-valued time domain orthogonal frequency division multiplexing (OFDM) or single carrier frequency division multiplexing (SC-FDM) symbol signal. The OFDM signal generators 306 may perform inverse fast Fourier transform (IFFT) on the antenna-specific symbols and insert a cyclic prefix (CP) into the resulting IFFT time domain symbol. Digital-to-analog conversion, frequency upconversion, etc applied to the OFDM symbol and then transmitted through the transmission antennas to a receiving device 20. The OFDM signal generators 306 may include an IFFT module, a CP inserter, a digital-to-analog converter (DAC), a frequency upconverter, etc.

In the meantime, if the UE or eNB applies the SC-FDMA scheme to codeword transmission, the transmitter or processor may include a discrete Fourier transform (DFT) module 307 (or fast Fourier transform (FFT) module). The DFT module 307 performs DFT or FFT (hereinafter referred to as DFT/FFT) on the antenna specific symbol, and outputs the DFT/FFT symbol to the resource element mapper 305.

The receiving device 20 operates in the reverse order to the operation of the transmitting device 10. Specifically, the receiving device may include a signal recoverer for recovering a received signal into a baseband signal, a multiplexer for multiplexing a received and processed signal, and a channel demodulator for demodulating a multiplexed signal stream into a codeword. The signal recoverer, the multiplexer, and the channel demodulator may be comprised of one integrated module or independent modules for performing respective functions. For example, the signal recoverer may include an analog-to-digital converter (ADC) for converting an analog signal into a digital signal, a CP remover for removing a CP from the digital signal, an FFT module for generating a frequency-domain symbol by performing FFT upon the CP-removed signal, and an RE demapper/equalizer for recovering the frequency-domain symbol into an antenna-specific symbol. The multiplexer recovers the antenna-specific symbol into a transmission layer and the channel demodulator recovers the transmission layer into the codeword that the transmitting device desires to transmit.

Meanwhile, upon receiving signals transmitted by an SC-FDMA scheme, the receiving device 20 further includes an inverse discrete Fourier transmission (IFFT) module (or an inverse fast Fourier transform (IFFT) module). The IDFT/IFFT module performs IDFT/IFFT upon the antenna-specific symbols recovered by the RE demapper and transmits the IDFT/IFFT-processed symbol to the multiplexer.

For reference, the processor 11 of the transmitting device 10 in FIG. 8 may be configured to include the scramblers 301, the modulation mappers 302, the layer mapper 303, the precoder 304, the RE mappers 305, and the OFDM signal generators 306. Likewise, the processor 21 of the receiving device 20 in FIG. 8 may be configured to include the signal recoverer, the multiplexer, and the channel demodulator.

In order for the receiving device 20 to restore a signal transmitted by the transmitting device 10, an RS for estimating a channel between the receiving device and the transmitting device is needed. RSs may be categorized into RSs for demodulation and RSs for channel measurement. CRSs defined in the 3GPP LTE system can be used for both demodulation and channel measurement. In a 3GPP LTE-A system, a UE-specific RS (hereinafter, a UE-RS) and a CSI-RS are further defined in addition to a CRS. The UE-RS is used to perform demodulation and the CSI-RS is used to derive CSI. Meanwhile, RSs are divided into a dedicated RS (DRS) and a common RS (CRS) according to whether a UE recognizes presence thereof. The DRS is known only to a specific UE and the CRS is known to all UEs. Among RSs defined in the 3GPP LTE-A system, the cell-specific RS may be considered a sort of the common RS and the DRS may be considered a sort of the UE-RS.

For reference, since demodulation can be understood as part of a decoding process, the term demodulation is used interchangeably with the term decoding in the present invention.

Figure 9:
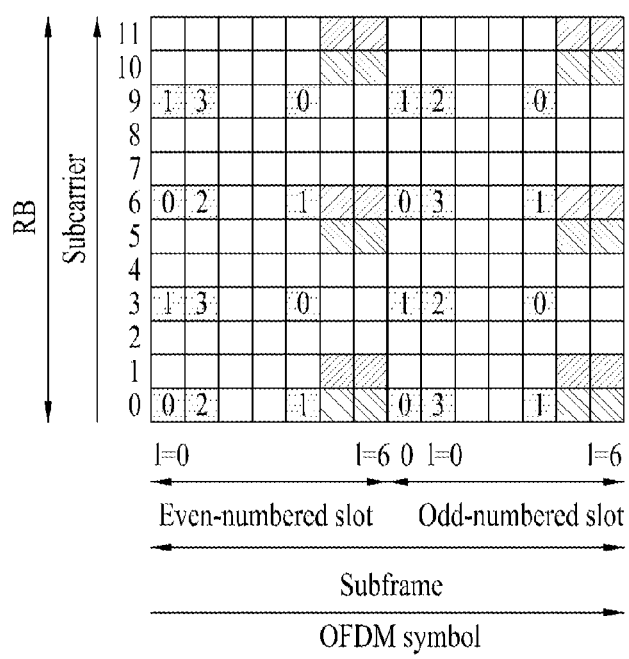
FIG. 9 illustrates configuration of cell specific reference signals (CRSs) and user specific reference signals (UE-RSs).

FIG. 9 illustrates configuration of cell specific reference signals (CRSs) and user specific reference signals (UE-RSs). Particularly, FIG. 9 illustrates REs occupied by the CRS(s) and the UE-RS(s) in an RB pair of a subframe with a normal CP.

In an existing 3GPP system, since CRSs are used for both demodulation and measurement, the CRSs are transmitted in all DL subframes in a cell supporting PDSCH transmission and are transmitted through all antenna ports configured at an eNB.

More specifically, CRS sequence $r_{l,n_s}(m)$ is mapped to complex-valued modulation symbols $\alpha_{k,l}^{(p)}$ used as reference symbols for antenna port p in slot $n_s$ according to the following equation.

$$\alpha_{k,l}^{(p)} = r_{l,n_s}(m') \qquad \text{[Equation 1]}$$

where $n_s$ is the slot number in a radio frame, and l is the OFDM symbol number within the slot, which is determined according to the following equation.

$$k = 6m + (v + v_{shift}) \bmod 6 \qquad \text{[Equation 2]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

where k denotes a subcarrier index, l denotes an OFDM symbol index, and $N^{max,DL}_{RB}$ denotes the largest DL bandwidth configuration, expressed as an integer multiple of $N^{RB}_{sc}$.

Parameters $v$ and $v_{shift}$ define locations for different RSs in the frequency domain and v is given as follows.

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases} \qquad \text{[Equation 3]}$$

The cell-specific frequency shift $v_{shift}$ is given by a physical layer cell identity $N^{cell}_{ID}$ as follows.

$$v_{shift} = N_{ID}^{cell} \bmod 6 \qquad \text{[Equation 4]}$$

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS. Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

The CSI-RS (not shown) is a DL RS introduced in 3GPP LTE-A for channel measurement rather than demodulation purposes. In 3GPP LTE-A, a plurality of CSI-RSs (also called CSI-RS patterns) is defined for CSI-RS transmission. The CSI-RS is transmitted according to CSI-RS configuration in subframes in which CSI transmission is configured rather than every subframe.

A UE which is configured to operate in a transmission mode (e.g. transmission mode 9 or other newly defined transmission mode) defined after 3GPP LTE-A may perform channel measurement using the CSI-RS and decode the PDSCH using the UE-RS.

UE-RSs are transmitted on antenna port(s) p=5, p=7, p=8 or p=7, 8, . . . , v+6 for PDSCH transmission, where v is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped. That is, the UE-RSs are configured to be transmitted only on RB(s) to which a PDSCH is mapped in a subframe in which the PDSCH is scheduled unlike CRSs configured to be transmitted in every subframe irrespective of whether the PDSCH is present. Therefore, RS overhead can be reduced in the UE-RSs relative to the CRSs.

In the 3GPP LTE-A system, the UE-RSs are defined in a PRB pair. Referring to FIG. 9, in a PRB having frequency-domain index $n_{PRB}$ assigned for PDSCH transmission with respect to p=7, p=8, or p=7, 8, . . . , v+6, a part of UE-RS sequence r(m) is mapped to complex-valued modulation symbols $\alpha_{k,l}^{(p)}$ in a subframe according to the following equation.

$$\alpha_{k,l}^{(p)} = w_p(l') \cdot r(3 \cdot l' \cdot N_{RB}^{max,DL} + 3 \cdot n_{PRB} + m') \qquad \text{[Equation 4]}$$

where $w_p(i)$, l', m' are given as follows.

[Equation 5]

$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with configuration 3, 4, or 8 (see Table 2)} \\ l' \bmod 2 + 2 + 3\lfloor l'/2 \rfloor & \text{if in a special subframe with configuration 1, 2, 6, or 7 (see Table 2)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

where the sequence $\overline{w}_p(i)$ for normal CP is given according to the following equation.

TABLE 4

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

For antenna port p∈{7, 8, . . . , υ+6}, the UE-RS sequence r(m) is defined as follows $$r(m) = \frac{1}{\sqrt{2}}(1 - 2 \cdot c(2m)) + j\frac{1}{\sqrt{2}}(1 - 2 \cdot c(2m+1)),$$ [Equation 7]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

c(i) is a pseudo-random sequence defined by a length-31 Gold sequence. The output sequence c(n) of length $M_{PN}$, where n=0, 1, . . . , $M_{PN}$−1, is defined by the following equation.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2$$ [Equation 8]

where $N_C$=1600 and the first m-sequence is initialized with $x_1(0)$=1, $x_1(n)$=0, n=1, 2, . . . , 30. The initialization of the second m-sequence is denoted by $c_{init}=\Sigma_{i=0}^{30} x_2(i) \cdot 2^i$ with the value depending on the application of the sequence.

In Equation 7, the pseudo-random sequence generator for generating c(i) is initialized with $c_{init}$ at the start of each subframe according to the following equation.

$$c_{init}=(\lfloor n_s/2 \rfloor+1)\cdot(2n_{ID}^{(nSCID)}+1)\cdot 2^{16}+n_{SCID}$$ [Equation 9]

In Equation 9, the quantities $n^{(i)}_{ID}$,i=0,1, which is corresponding to $n_{ID}^{(nSCID)}$, is given by a physical layer cell identifier $N^{cell}_{ID}$ if no value for $n^{DMRS,i}_{ID}$ is provided by higher layers or if DCI format 1A, 2B or 2C is used for DCI format associated with the PDSCH transmission, and given by $n^{DMRS,i}_{ID}$ otherwise.

In Equation 9, the value of $n_{SCID}$ is zero unless specified otherwise. For a PDSCH transmission on antenna ports 7 or 8, $n_{SCID}$ is given by the DCI format 2B or 2D. DCI format 2B is a DCI format for resource assignment for a PDSCH using a maximum of two antenna ports having UE-RSs. DCI format 2C is a DCI format for resource assignment for a PDSCH using a maximum of 8 antenna ports having UE-RSs.

Unlike a PDCCH transmitted based on a CRS, the EPDCCH is transmitted based on a demodulation RS (hereinafter, DM-RS). Therefore, the UE decodes/demodulates the PDCCH based on the CRS and decodes/demodulates the EPDCCH based on the DM-RS. The DM-RS associated with EPDCCH is transmitted on the same antenna port p∈{107,108,109,110} as the associated EPDCCH physical resource; is present for EPDCCH demodulation only if the EPDCCH is associated with the corresponding antenna port; and is transmitted only on the PRB(s) upon which the corresponding EPDCCH is mapped.

In case of a normal CP, for the antenna port p∈{107,108,109,110} in a PRB with an index $n_{pRB}$ assigned for the EPDCCH transmission, a part of DM-RS sequence r(m) can be mapped to complex-valued modulation symbols $\alpha_{k,l}^{(p)}$ according to the following equation.

$$\alpha_{k,l}^{(p)}=w_p(l')\cdot r(3\cdot l'\cdot N_{RB}^{max,DL}+3\cdot n_{PRB}+m')$$ [Equation 10]

where $w_p(i)$, l', and m' can be given according to the following equation.

[Equation 11]

$$w_p(i) = \begin{cases} \bar{w}_p(i) & (m' + n_{PRB})\bmod 2 = 0 \\ \bar{w}_p(3-i) & (m' + n_{PRB})\bmod 2 = 1 \end{cases}$$

$$k = 5m' + N_{sc}^{RB}n_{PRB} + k'$$

$$k' = \begin{cases} 1 & p \in \{107, 108\} \\ 0 & p \in \{109, 110\} \end{cases}$$

$$l = \begin{cases} l'\bmod 2 + 2 & \text{if in a special subframe with configuration 3, 4, or 8 (see Table 2)} \\ l'\bmod 2 + 2 + 3\lfloor l'/2 \rfloor & \text{if in a special subframe with configuration 1, 2, 6, or 7 (see Table 2)} \\ l'\bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7 (see Table 2)} \\ 0, 1 & \text{if } n_s \bmod 2 = 0 \text{ and not in special subframe with configuration 1, 2, 6, or 7 (see Table 2)} \\ 2, 3 & \text{if } n_s \bmod 2 = 1 \text{ and not in special subframe with configuration 1, 2, 6, or 7 (see Table 2)} \end{cases}$$

$$m' = 0, 1, 2$$

The sequence $\bar{w}_p(i)$ for the normal CP is given according to the following equation.

TABLE 5

| Antenna port p | $[\bar{w}_p(0)\ \bar{w}_p(1)\ \bar{w}_p(2)\ \bar{w}_p(3)]$ |
|---|---|
| 107 | [+1 +1 +1 +1] |
| 108 | [+1 −1 +1 −1] |
| 109 | [+1 +1 +1 +1] |
| 110 | [+1 −1 +1 −1] |

For example, REs occupied by UE-RS(s) of antenna port 7 or 8 in FIG. 9 may be occupied by DM-RS(s) of antenna port 107 or 108 in a PRB to which the EPDCCH is mapped and REs occupied by UE-RS(s) of antenna port 9 or 10 in FIG. 9 may be occupied by DM-RS(s) of antenna port 109 or 110 in a PRB to which the EPDCCH is mapped. Consequently, as in a UE-RS for demodulating a PDSCH, if the type of the EPDCCH and the number of layers are the same in a DM-RS for demodulating the EPDCCH, REs of a predetermined number per RB are used for DM-RS transmission regardless of a UE or a cell. Hereinafter, the PDCCH or the EPDCCH will be referred to as a PDCCH.

A DM-RS sequence r(m) for the EPDCCH with respect to antenna port p∈{7, 8, . . . , υ+6} is defined by Equation 7. Pseudo-random sequence c(i) in Equation 7 is defined by Equation 8 and a pseudo-random sequence generator for generating c(i) is initialized to $c_{init}$ according to the following equation at the start of each subframe.

$$C_{init}=(\lfloor n_s/2 \rfloor+1)\cdot(2n_{ID}^{EPDCCH}+1)\cdot 2^{16}+n_{SCID}^{EPDCCH} \quad \text{[Equation 12]}$$

An EPDCCH DMRS scrambling sequence initialization parameter $n^{EPDCCH}_{SCID}$ is provided by a higher layer signal.

Meanwhile, in order to for an eNB to decode a UL signal received through a UL channel (e.g. PUCCH or PUSCH), a reference signal (RS) which is to be compared with the data signal is needed. Hereinafter, an RS for demodulation of the UL signal (e.g. DCI) through the PUCCH will be referred to as a PUCCH DMRS and an RS for demodulating the UL signal (e.g. UL data) through the PUSCH will be referred to as a PUSCH DMRS. The PUCCH DMRS is transmitted in a PUCCH region for demodulation of the DCI transmitted through the PUCCH in the PUCCH region and the PUSCH DMRS is transmitted in a PUSCH region for demodulation of UCI and/or data through the PUSCH in the PUSCH region. The PUCCH DMRS and the PUSCH DMRS may be referred to as a UL UE-RS or a UL DMRS.

The PUCCH DMRS is spread by an orthogonal sequence of a predetermined length according to a PUCCH format and/or CP length and then transmitted using a predetermined number of SC-FDMA symbols of each RB in a RB pair occupied by the PUCCH. For example, in the case of a normal CP, the PUCCH DMRS for a series of PUCCH format 1 may be spread by an orthogonal sequence of length 3 and transmitted over OFDM symbols 2 to 4 among OFDM symbols 0 to 6 of each RB occupied by the PUCCH, and the PUCCH DMRS for a series of PUCCH format 2 and 3 may be spread by an orthogonal sequence of length 2 and then transmitted over OFDM symbols 1 and 5 among OFDM symbols 0 to 6 of each RB occupied by the PUCCH.

According to the present invention, if channel estimation is performed using an RS transmitted in multiple subframes in an environment in which a channel state is less changed over time, a receiving device can more successfully receive data. Therefore, the present invention proposes that a transmitting device transmit a signal based on the same RS during a predetermined duration of subframes to the receiving device in an environment in which a channel state is less changed. For example, an RS sequence pre-known by the receiving device may be applied during the predetermined duration of subframes even if the RS sequence is equal or different according to subframes; an RS symbol preknown by the receiving device may be applied during the predetermined duration of subframes even if the RS symbol is equal or different according to subframes; and/or a precoding matrix pre-known by the receiving device may be applied during the predetermined duration of subframes even if the precoding matrix is equal or different according to subframes. The receiving device may perform channel estimation using RSs received in multiple subframes during the corresponding duration and may use channel estimation to demodulate/decode the received signals. For example, the UE or the eNB according to the present invention may perform channel estimation using DMRSs transmitted in multiple subframes and use the DMRSs to demodulate data in an environment in which a channel is hardly changed. In more detail, the UE or the eNB may apply the same precoding matrix to signals which are to be transmitted in subframes corresponding to a predetermined duration.

The present invention may be applied to both DL transmission/reception and UL transmission/reception. The present invention may also be applied not only to DMRS based transmission but also to transmission based on other RSs such as a CRS. However, the present invention may be more useful for DMRS based transmission in which precoding is applied to RSs by the eNB, embodiments of the present invention will be described below by way of example of DMRS based transmission/reception. Data according to subframes may be equal in terms of data decoding but the embodiments of the present invention may be applied if the receiving device can use RSs received in multiple subframes for channel estimation although the data differs.

Bundled Subframes

The embodiments of the present invention are applicable to bundled subframes. The bundled subframes refer to a bundle of multiple subframes used for transmission of the same signal/data. Signal transmission by a transmitting device having low power or signal transmission in a cell having a very poor channel state may cause a coverage issue. In order to solve the coverage problem, a coverage enhancement scheme such as subframe repetition and subframe bundling may be applied to physical channel/signal transmission. In other words, if there is a coverage issue, the transmitting device repeatedly transmits a physical channel/signal over multiple subframes so that a receiving device may combine or connect (weak) physical channels/signals received over multiple subframes and decode the channels/signals. For example, an eNB may repeatedly transmit a PUCCH or a PDSCH (hereinafter, PDCCH/PDSCH) in multiple subframes for coverage enhancement of the PDCCH. A UE may successfully receive the PDCCH/PDSCH using PDCCH/PDSCH signals received together in a bundle of multiple subframes. In addition, the eNB may cause the UE, which has low power, is distant from the eNB, or is subject to severe interference, to repeatedly transmit the PUCCH/PUSCH in a bundle of multiple subframes. In other words, the present invention may be applied to a bundled physical channel/signal transmitted in multiple subframes.

For the UE with a coverage issue, the eNB may configure subframes in which a physical channel/signal is to be repeatedly transmitted using a higher layer signal, etc. For example, the eNB may transmit subframe configuration information for applying PDCCH, PDSCH, PUCCH and/or PUSCH bundle transmission to the UE. The subframe configuration information may include the number of bundled subframes, a bundle transmission offset, and/or a bundle transmission period. The bundle transmission offset may indicate the location at which bundled subframes are started. For example, the bundle transmission offset may be information indicating the location of a subframe at which bundled subframes are started among subframes in a predetermined number of radio frames. The bundle transmission period may indicate a period during which bundle transmission is applied, i.e. a period during which bundled subframes are configured. Bundled subframes for bundle transmission may be applied only once or may be repeatedly applied every predetermined number of frames/subframes. Among subframes corresponding to a predetermined duration, bundled subframes may be configured by subframe pattern information. For example, a bitmap consisting of bits corresponding one to one to a plurality of subframes may indicate the bundled subframes.

The bundled subframe may be preconfigured and may be activated or deactivated by a higher layer signal or a physical layer signal. If the bundled subframe is activated, the UE/eNB of the present invention may apply embodiments of the present invention to the bundled subframes.

A. Indication of Bundled Subframes

The present invention proposes that the same precoding matrix be applied to signals transmitted in bundled subframes. A UE or an eNB that has received the signals in the bundled subframes may perform channel estimation using DMRSs of the subframes and use channel estimation to decode data transmitted in the subframes. The bundled subframes may constitute one bundled subframe set and the same precoding matrix may be applied to the subframes constituting one bundled subframe set. Alternatively, precoding shifting/hopping formed by a predefined pattern may be applied to the subframes constituting one bundled subframe set.

Figure 10:
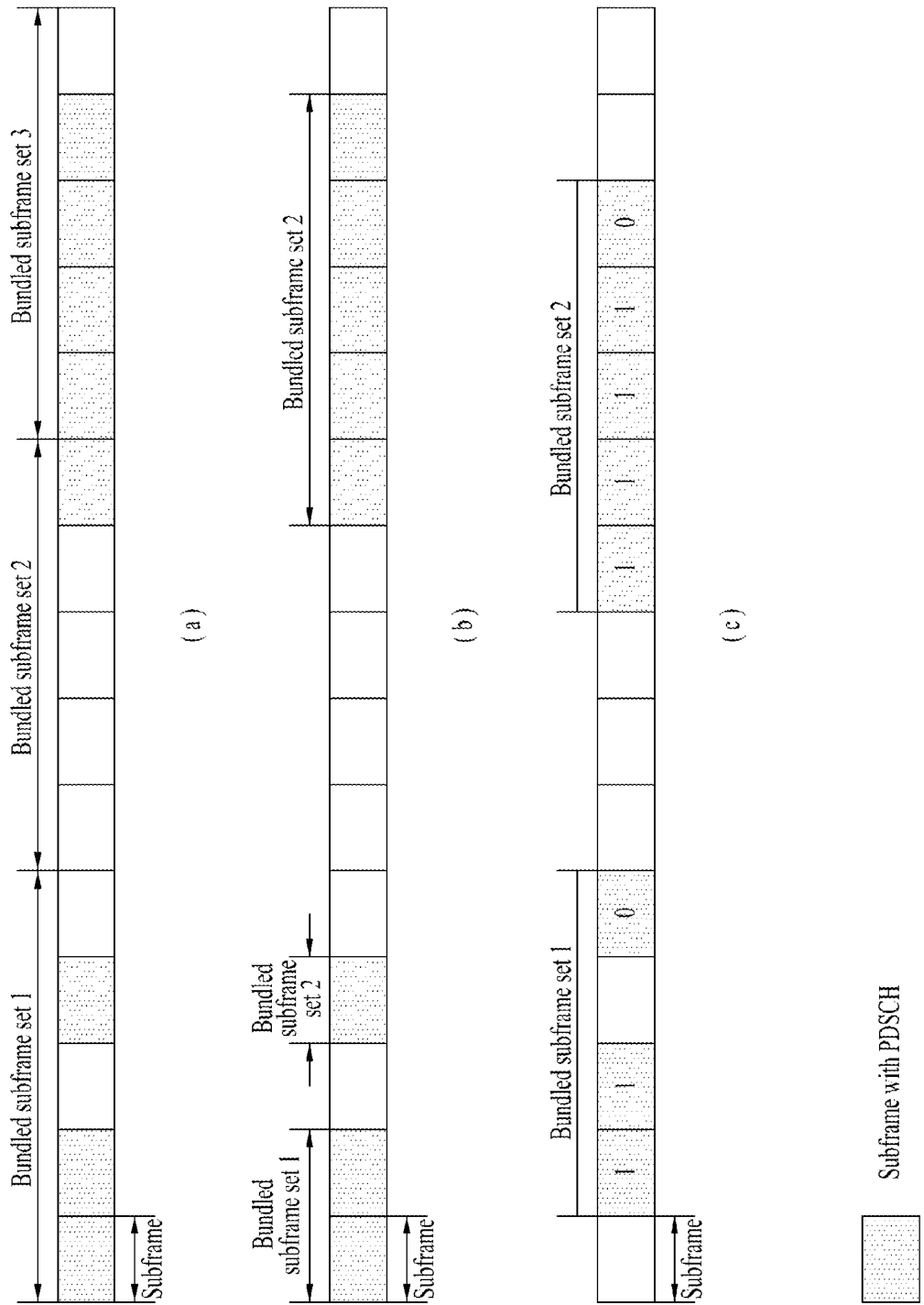
FIG. 10 illustrates configuration of a bundled subframe set according to embodiments of the present invention.

FIG. 10 illustrates configuration of a bundled subframe set according to embodiments of the present invention. Bundled subframes to which the present invention is applied may be configured, for example, by the following schemes.

1) Bundled Subframe Set Configuration 1

Bundled subframes may consist of a predetermined number of subframes as illustrated in FIG. 10(a). That is, N subframes may constitute one bundled subframe set and the same precoding matrix may be applied to the N bundled subframes. FIG. 10(a) illustrates an example of bundled subframes consisting of five subframes. Referring to FIG. 10(a), one bundled subframe set may consist of five subframes and the same precoding matrix may be applied to the five bundled subframes in the bundled subframe set.

The number of bundled subframes may be fixed to a predetermined value. For example, the number of bundled subframes may be always fixed to 4 and the same precoding matrix may be applied in the unit of four subframes.

Alternatively, information about the number of bundled subframes may be indicated by a higher layer signal and the number of bundled subframes may be configured according to a channel environment. Alternatively, the information about the number of bundled subframes may be indicated by DCI. For example, a new field may be added to the DCI and the remaining number of bundled subframes except for subframes in which the DCI is received or the number of bundled subframes including the subframes in which the DCI is received may be indicated in the added field. The UE may recognize how many subframes starting from a subframe in which the DCI is currently received are used to apply the same precoding through the field of the DCI and use recognized information for channel estimation. Alternatively, information about how many bundled subframes constitute one bundled subframe set may be transmitted through the new field of the DCI. In this case, a subframe in which bundled subframes are started may be a subframe in which a field indicating the number of bundled subframes among fields in DCI of the corresponding subframe has a value other than 0.

The location of a subframe at which each bundled subframe set is started may be predesignated. For example, if the number of bundled subframes is 4, subframes 0, 4, 8, 12, and 16 based on a 40 ms frame structure may be predefined as a start frame of each bundled subframe set. As illustrated in FIG. 10(a), data may be transmitted in some subframes among subframes in one bundled subframe set. In this case, the UE or the eNB may perform channel estimation using only DMRSs of subframes in which data is transmitted. Accordingly, in order to obtain better channel estimation performance, it is preferable to transmit the data in all available subframes in one bundled subframe set. Alternatively, for channel estimation in subframes in which data is not transmitted although the subframes are included in the bundled subframe set, DMRSs associated with the data may be transmitted.

Meanwhile, when TTI bundling is applied, subframes to which TTI bundling is applied may constitute one bundled subframe set. If TTI bundling is configured, the same data is repeatedly transmitted in a predetermined number (e.g. 4) of consecutive subframes. Notably, a repetitive version of the repeatedly transmitted data varies with the number of repetitions. In a TTI bundle, HARQ retransmissions are non-adaptive and are triggered without waiting for feedback from previous transmissions. HARQ feedback of the TTI bundle is received only in the last TTI of the TTI bundle. According to this embodiment, the same precoding matrix may be applied to subframes in which such TTI bundling is applied. In DL, the eNB according to the present embodiment may indicate whether the UE is capable of performing channel estimation using DMRSs together which are received in subframes to which TTI bundling is applied. In UL, the eNB according to this embodiment may indicate whether the UE should transmit signals using the same precoding matrix in subframes to which TTI bundling is applied. A bit indicating whether the same DMRS is applied to a TTI bundle may be included in DCI and then transmitted or may be UE-specifically or cell-specifically indicated through a higher layer signal.

2) Bundled Subframe Set Configuration 2

Bundled subframes may consist of a variable number of subframes as illustrated in FIG. 10(b). For example, when a PDSCH is transmitted to a UE in N consecutive subframes or a PUSCH is transmitted from a specific UE to an eNB in N consecutive subframes, the N subframes may constitute one bundled subframe set and the same precoding matrix may be used in the N subframes. For example, as illustrated in FIG. 10(b), consecutive subframes may be bundled subframes and the same precoding matrix may be used in the subframes. In this case, the number of bundled subframes in which the UE or the eNB can assume that the same precoding matrix is used may be a variable value other than a fixed value. However, in order to obtain better channel estimation performance, it is preferable to apply the same precoding matrix to as many subframes as possible in one bundled subframe set.

The number of bundled subframes may be indicated by DCI. For example, a new field may be added to the DCI and the remaining number of bundled subframes except for subframes in which the DCI is received or the number of bundled subframes including the subframes in which the DCI is received may be indicated in the added field. As another example, information indicating how many bundled subframes constitute a bundled subframe set to which a current signal transmission subframe belongs may be transmitted through the new field of the DCI. In DL, the UE may recognize how many subframes starting from a current signal reception subframe are used to apply the same precoding through the field of the DCI and may use recognized information for channel estimation. In UL, the UE may recognize how many subframes starting from a current signal transmission subframe are used to transmit data/information using the same precoding matrix through the field of the DCI.

3) Bundled Subframe Set Configuration 3

Bundled subframes may be configured as illustrated in FIG. 10(c). For example, a bundled subframe set may be started at a specific timing at which a PDSCH is transmitted to a UE and the bundled subframe set may be terminated after a predetermined time. Alternatively, the bundled subframe set may be started at a specific timing at which a PUSCH is transmitted from a specific UE to an eNB and the bundled subframe set may be ended after a predetermined time. That is, although one bundled subframe set may include a subframe in which data is not actually transmitted as illustrated in FIG. 10(a), the location of a subframe at which one bundled subframe set is started may be variable.

In order to configure such a bundled subframe set, the UE needs to be aware of the subframe in which a bundled subframe set is started and of a duration of the bundled subframe set or a subframe in which the bundled subframe set is ended.

For example, the location of a subframe at which one bundled subframe set is started may be a subframe in which data is transmitted. The eNB may inform the UE of a subframe in which the bundled subframe set is started through DCI.

The duration of the bundled subframe set may always be a constant value or may be a variable value. When the duration of the bundled subframe set is the constant value, a predetermined value may be used as the duration of the bundled subframe set or a value indicated by a higher layer may be used as the duration of the bundled subframe set.

Alternatively, the eNB may inform the UE of the duration of the bundled subframe set through DCI of a subframe in which the bundled subframe set is started. To indicate the start location, duration, or end location of the bundled subframe set, one explicit bit may be used in the DCI. For example, referring to FIG. 10(c), when a value of a specific field of the DCI is set to 1, a subframe in which the DCI is transmitted may be a start subframe or a maintenance subframe (i.e. other than an end subframe) of the bundled subframe set. Meanwhile, if the value of the specific field of the DCI is set to 0, a subframe in which the DCI is received may be the last subframe of the bundled subframes or a subframe to which subframe bundling is not applied. That is, if a value of a field in previous DCI, i.e. in DCI received in a previous subframe, is 0 and a value of a field in current DCI, i.e. in DCI received in a current subframe, is 1, the current subframe may be a subframe in which the bundled subframe set is started. On the other hand, if the value of the field of the previous DCI is 1 and the value of the field of the current DCI is 1, the current subframe may be a subframe in which the bundled subframe set is maintained. If the value of the field of the previous DCI is 1 and the value of the field of the current DCI is 0, the current subframe may be the last subframe of the bundled subframe set. If the value of the field of the previous DCI is 0 and the value of the field of the current DCI is 0, the current subframe may be a subframe which is not included in the bundled subframe set. Only a DMRS may be transmitted for channel estimation in a subframe in which data is not transmitted although the subframe is included in the bundled subframe set.

B. Transmission on Bundled Subframes

The same precoding matrix may be applied to transmission signals in bundled subframes. In DMRS based transmission, a DMRS transmitted in some frequency bands in which a physical channel is transmitted is precoded by the same precoding matrix as a precoding matrix applied to the physical channel and transmitted together with the physical channel in one subframe. Therefore, the receiving device 20 may demodulate a transmission signal based on the DMRS even though information about a precoding matrix applied by the transmitting device 10 to the transmission signal is not received from the transmitting device 10. Unlike DMRS based transmission, in CRS based transmission, since a physical channel and a CRS are not precoded by the same precoding matrix, the eNB should notify the UE of a precoding matrix applied to the physical channel in order to decode the physical channel based on the CRS. Accordingly, in order to demodulate data transmitted in a subframe in which CRS based demodulation other than DMRS based demodulation is performed, information about a precoding matrix used for the data may be indicated through DCI for scheduling the data using the same method as a conventional method. If data which is to be transmitted in each of bundled subframes is scheduled by individual DCI, each DCI for data which is to be transmitted in each of the bundled subframes may include precoding matrix information.

Alternatively, a precoding matrix used in bundled subframes may be indicated through DCI of the foremost subframe among the bundled subframes. In DL, the UE may (perform channel estimation and) perform data demodulation/decoding under the assumption that a precoding matrix indicated by DCI of the foremost subframe among the bundled subframes is identically applied to the bundled subframes. In UL, the UE may identically apply the precoding matrix indicated by the DCI of the foremost subframe among the bundled subframes to UL signals which are to be transmitted in the bundled subframes.

Meanwhile, if a subframe in which data is not transmitted but a DMRS for channel estimation is transmitted is present, the DMRS may be transmitted using a predetermined precoding matrix.

For DMRS based channel estimation, the UE according to an embodiment of the present invention may assume that $n_{SCID}$ (refer to $n_{SCID}$ of Equation 9) which is a scrambling ID used to generate a DMRS sequence is the same over bundled subframes. For DMRS based channel estimation, the UE may assume that $n_{ID}$ (refer to $n_{ID}^{nSCID}$) of Equation 9) for generating a DMRS sequence is the same over bundled subframes. For example, the UE configured to perform a CoMP operation or operate in transmission mode 10 associated with the CoMP operation may assume that a virtual cell ID, $n_{ID}$, provided by a higher layer signal to generate the DMRS sequence is the same over bundled subframes. In other words, $n_{SCID}$ and/or $n_{ID}$ which are applied to bundled subframes may be signaled by a higher layer signal. Alternatively, $n_{SCID}$ and/or $n_{ID}$ which are indicated by DCI for the first subframe among the bundled subframes may be applied during the bundled subframes.

Meanwhile, in order to facilitate channel estimation using a DMRS transmitted over multiple subframes, it is preferable not to change, if possible, a channel situation in which the DMRS is transmitted in multiple subframes. Accordingly, when data is transmitted in bundled subframes, transmitting data associated with the DMRS using the same RB(s) during a time duration of the bundled subframes may be helpful for channel estimation. Therefore, when the bundled subframes are used, it is preferable not to use frequency hopping in the bundled subframes. A UE or an eNB may assume that data is transmitted in the same RB(s) during a duration of the bundled subframes. In other words, the UE may demodulate or decode data using DMRSs received in the same RB(s). Then, RB(s) in which the data is transmitted may be indicated by only DCI of the foremost subframe among the bundled subframes rather than all DCI of the bundled subframes.

If frequency hopping is enabled and TTI bundling for data transmission is enabled, the UE may assume that channel estimation bundling can be performed only for subframes in which DMRS data is located in the same RB(s). For example, if DMRS bundling is used over 5 subframes and frequency hopping is enabled such that the first, third, and fifth subframes share the same resource and the second and fourth subframes share the same resource, the UE or the eNB may assume that only the first, third, and fifth subframes are bundled for DMRS bundling and the second and fourth subframes are bundled for DMRS bundling. Notably, it is possible to enable DMRS bundling with a bundled size regardless of frequency hopping.

If DMRS bundling is configured/enabled, the UE does not assume that data in assigned RB(s) (for DMRS bundling) is used only for itself. The UE may assume that the same resource in which a DMRS can be used for DMRS bundling may be used to transmit other data or control information for other UE(s).

In a DMRS bundling window, i.e. in a duration of subframes during which DMRS bundling is applied, the UE may assume that PRB bundling is enabled such that precoding may be the same in the same PRB group over subframes and precoding may differ according to PRB groups over subframes. Namely, the UE for which PRB bundling is configured may assume that PRB bundling is enabled in the bundling window, wherein precoding is the same in PRBs in the same PRB group and is the same even in subframes in the bundling subframe window. As a result, if a bundled subframe set according to the present invention is configured and PRB bundling for a PRB group is configured, the UE may assume that precoding applied to the PRB group during the bundled subframe set is the same. That is, the same precoding is applied to RB(s) of a PRB group over multiple subframes. However, different precoding may be applied to different PRB groups. In other words, if multiple PRB groups are configured, applied precoding may differ according to the PRB groups. Alternatively, once DMRS bundling is enabled, the UE may assume that PRB bundling is disabled so that precoding is the same over assigned RB(s).

For reference, PRB bundling refers to the case in which the UE assumes that precoding granularity is a plurality of resource blocks in the frequency domain. Since closed-loop based MIMO requires PMI feedback, if a different PMI should be fed back according to a PRB, feedback overhead is greatly increased. In addition, since frequency selectivity will not be wide between neighboring PRBs, PRB bundling for enabling the UE to estimate channel states of neighboring PRBs together under the assumption that the same precoder is applied to DMRSs of the neighboring PRBs is effective in closed-loop based MIMO. For example, if PMI feedback is configured for the UE, it may be interpreted in the present invention that a closed-loop MIMO operation is configured for the UE. In this case, the UE may decode data received in neighboring PRBs under the assumption that the same precoder is applied to the neighboring PRBs scheduled for data transmission to the UE. In more detail, the UE configured for transmission mode 9 for given serving cell CC c may assume that precoding granularity is multiple resource blocks when PMI/RI feedback is configured. Fixed system bandwidth-dependent precoding resource block groups (PRGs) of size P' partition system bandwidth and each PRG consists of consecutive PRBs. If $N^{DL}_{RB}$ mod P'0>0, then one of the PRGs has a size of $N_{RB}^{DL} - P' \lfloor N_{rb}^{DL} / P' \rfloor$. The PRG size is non-increasing starting at the lowest frequency. The UE for which PMI/RI feedback is configured may receive or decode a PDSCH by assuming that the same precoder applies on all scheduled PRBs within a PRG. The PRG size that the UE may assume for given system bandwidth is given by:

TABLE 6

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

According to the afore-described embodiment of the present invention, if the eNB informs the UE of information about a subframe bundle, the UE may assume that the same precoding is used in the subframe bundle. Alternatively, the eNB may configure, for the UE, the number of subframes in which the same precoding is used in the subframe bundle.

A DMRS may be transmitted only in the first subframe or some subframes in a subframe bundle in which the same precoding is used. In the case of data or information demodulated/decoded based on a CRS, the CRS may be transmitted in the first subframe or some subframes in the subframe bundle. In this case, in a subframe in which the DMRS is not transmitted in the subframe bundle, data (PDSCH/PUSCH) may be transmitted at an RE location at which the DMRS is transmitted. The UE may estimate a channel using the DMRS of a subframe in which the DMRS is transmitted and use an estimated channel value to receive data in the subframe bundle in which the same precoding is used.

While the embodiment of the present invention has been described by way of example in which the same precoding matrix, the same cell ID for generating a DMRS, and/or the same scrambling ID for generating the DMRS are applied to bundled subframes, RSs received over the bundled subframes may be used to decode data received in the bundled subframes if the UE/eNB is aware of a precoding matrix, a cell ID, or a scrambling ID used according to the bundled subframes although different precoding matrices, different cells ID for DMRS generation, and/or different scrambling IDs for DMRS generation are applied to the bundled subframes.

C. HARQ Process for Bundled Subframes

HARQ is a method used for error control. HARQ-ACK transmitted in DL is used for error control regarding UL data and HARQ-ACK transmitted in UL is used for error control regarding DL data. In DL, an eNB schedules one or more RBs for a UE selected according to a predetermined scheduling rule and transmits data to the UE using the scheduled RBs. Hereinafter, scheduling information for DL transmission will be referred to as a DL grant and a PDCCH carrying the DL grant will be referred to as a DL grant PDCCH. In UL, the eNB schedules one or more RBs for a UE selected according to a predetermined scheduling rule and the UE transmits data using allocated resources in UL. A transmitting device performing a HARQ operation waits for an ACK signal after transmitting data (e.g. transport blocks or codewords). A receiving device performing the HARQ operation transmits an ACK signal only when the data has been correctly received and transmits a NACK signal when there is an error in the received data. Upon receiving the ACK signal, the transmitting device transmits next (new) data but, upon receiving the NACK signal, the transmitting device retransmits data. In a HARQ scheme, error data is stored in a HARQ buffer and initial data is combined with retransmission data in order to raise reception success rate.

The HARQ scheme is categorized as synchronous HARQ and asynchronous HARQ according to retransmission timing and as channel-adaptive HARQ and channel-non-adaptive HARQ depending upon whether channel state is considered during determination of the amount of retransmission resources.

In the synchronous HARQ scheme, when initial transmission fails, retransmission is performed at a timing determined by a system. For example, if it is assumed that retransmission is performed in every X-th (e.g. X=4) time unit (e.g. a TTI or subframe) after initial transmission fails, an eNB and a UE do not need to exchange information about retransmission timing. Therefore, upon receiving a NACK message, the transmitting device may retransmit corresponding data in every fourth time unit until an ACK message is received. In contrast, in the asynchronous HARQ scheme, retransmission timing is determined by new scheduling or additional signaling. That is, the retransmission timing for error data may be changed by various factors such as channel state.

In the channel-non-adaptive HARQ scheme, a modulation and coding scheme (MCS), the number of RBs, etc., which are needed for retransmission, are determined as those during initial transmission. In contrast, in the channel-adaptive HARQ scheme, the MCS, the number of RBs, etc. for retransmission are changed according to channel state. For example, in the channel-non-adaptive HARQ scheme, when initial transmission is performed using 6 RBs, retransmission is also performed using 6 RBs. In contrast, in the channel-adaptive HARQ scheme, even when initial transmission is performed using 6 RBs, retransmission may be performed using RBs less or greater in number than 6 according to channel state.

Based on such classification, a combination of the four HARQ schemes may be considered, but an asynchronous/channel-adaptive HARQ scheme and a synchronous/channel-non-adaptive HARQ scheme are mainly used. In the asynchronous/channel-adaptive HARQ scheme, the retransmission timing and the amount of retransmitted resources are adaptively changed according to channel state so as to maximize retransmission efficiency. However, since overhead is increased, this scheme is generally not considered in UL. Meanwhile, in the synchronous/channel-non-adaptive HAQR scheme, since the retransmission timing and retransmission resource allocation are determined by the system, almost no overhead occurs but retransmission efficiency is very low if this scheme is used in an environment in which the channel state is considerably changed. In current communication system, the asynchronous HARQ scheme is used in DL and the synchronous HARQ scheme is used in UL.

Meanwhile, a time delay occurs until an eNB receives ACK/NACK from a UE and transmits retransmission data after transmitting scheduling information and data according to the scheduling information. The time delay is generated due to a channel propagation delay or a time consumed for data decoding/encoding. Accordingly, if new data is transmitted after a HARQ process which is currently in progress is ended, a gap is created due to a time delay. In order to prevent a gap in data transmission from being created during a time delay duration, a plurality of independent HARQ processes is used. For example, when an interval between initial transmission and retransmission is 7 subframes, 7 independent HARQ processes may be performed to transmit data without a gap. A plurality of parallel HARQ processes enables successive UL/DL transmission while the eNB awaits HARQ feedback for previous UL/DL transmission. Each HARQ process is associated with a HARQ buffer of a medium access control (MAC) layer. Each HARQ process manages state parameters regarding the number of transmissions of a protocol data unit (PDU) in the buffer, HARQ feedback for a MAC PDU in the buffer, a current redundancy version, etc.

After receiving all bundled subframes, the UE or the eNB performs channel estimation using DMRSs transmitted in multiple subframes and decodes data transmitted over the corresponding subframes using the estimated channel, thereby receiving data with better performance transmitted over the bundled subframes. To this end, it is desirable to perform channel estimation after all subframes in bundled subframes are received and decode data transmitted in the first subframe of the bundled subframes using channel estimation. However, since more time is consumed to receive the data and perform decoding in comparison with a conventional scheme, use of a conventional HARQ process may be problematic. Therefore, the present invention proposes a HARQ process/HARQ timing that is applicable to the case in which bundled subframes are used, as described with reference to FIGS. 11 to 14.

FIGS. 11 to 14 illustrate HARQ processes for bundled subframes according to embodiments of the present invention. In FIGS. 11 to 14, A/N denotes ACK/NACK. In FIGS. 11 to 14, arrows in the direction of A/N subframes from data subframes denote data transmission/retransmission and arrows in the direction of the data frames from the A/N subframes denote ACK/NACK for corresponding data transmission/retransmission. In FIGS. 11 to 14, it is assumed that a subframe number is assigned starting from n−3.

Figure 11:
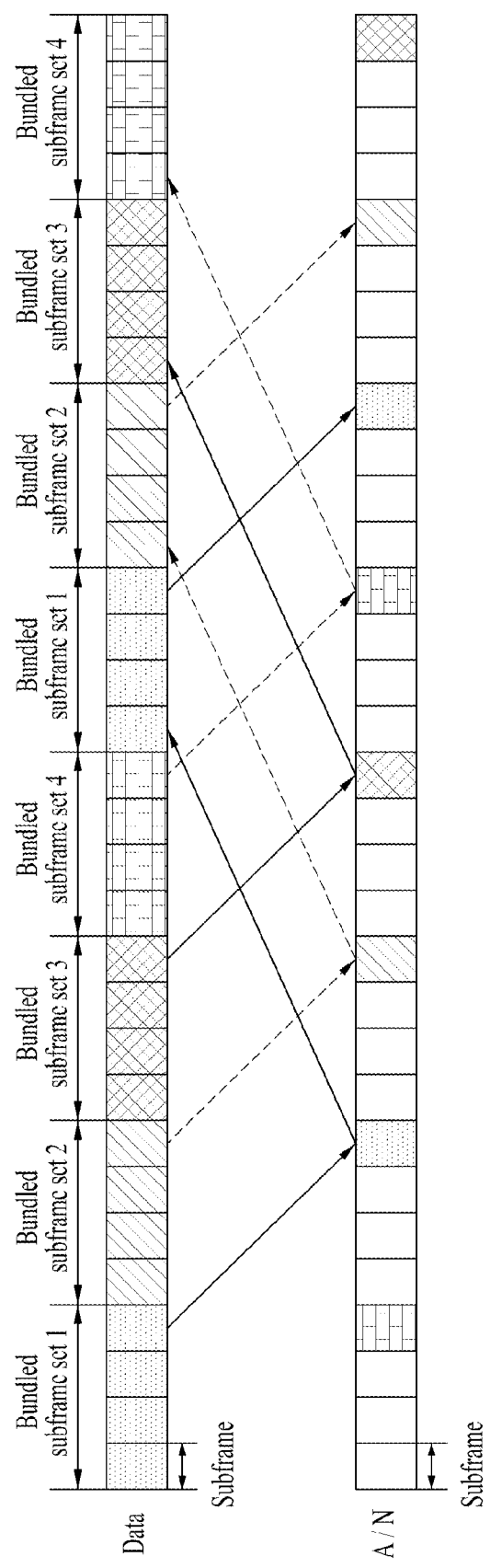
FIGS. 11 to 14 illustrate hybrid automatic repeat request (HARQ) processes for bundled subframes according to embodiments of the present invention.

When TTI bundling is used, a HARQ process used in conventional TTI bundling may be applied as illustrated in FIG. 11. In this case, data in bundled subframes is all the same and, therefore, only ACK/NACK for one PDSCH or PUSCH may be transmitted in one bundled subframe set. In UL, if data is transmitted in each of four bundled subframes (subframes n−3, n−2, n−1, and n), ACK/NACK for the data is transmitted in subframe n+4. If ACK/NACK information indicates NACK, retransmission of the data is performed in subframes n+13, n+14, n+15, and n+16. Accordingly, four HARQ processes operate. In DL, if data is transmitted in each of four bundled subframes (subframes n−3, n−2, n−1, and n), ACK/NACK for the data is transmitted in subframe n+4. Accordingly, four HARQ processes operate.

Figure 12:
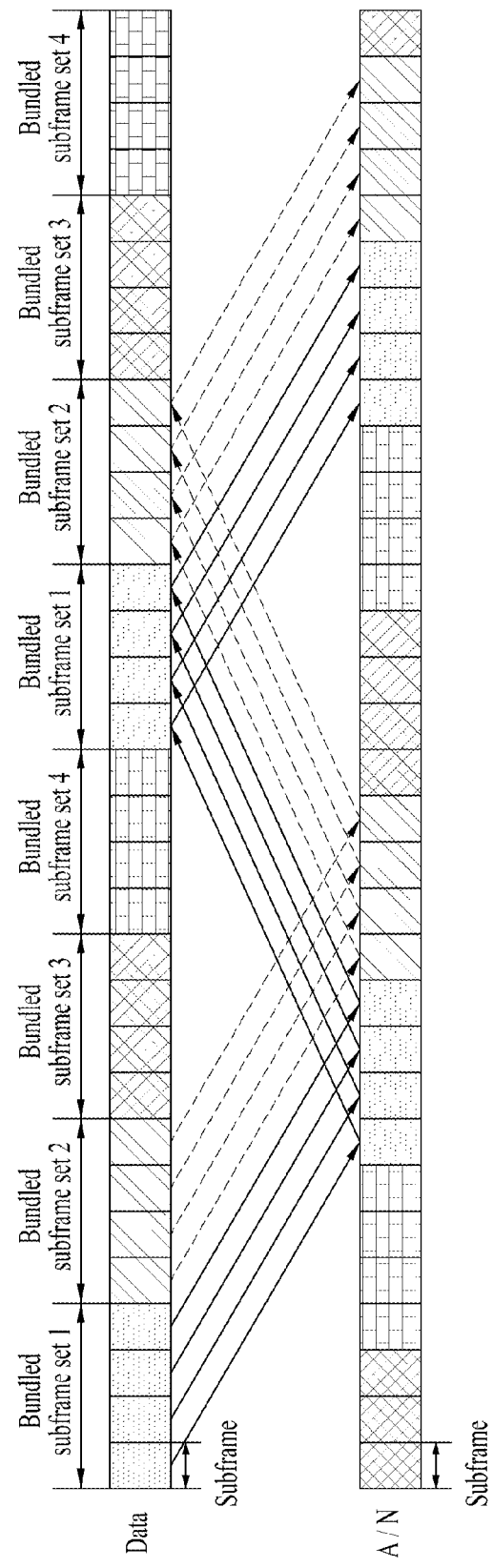
Figure 13:
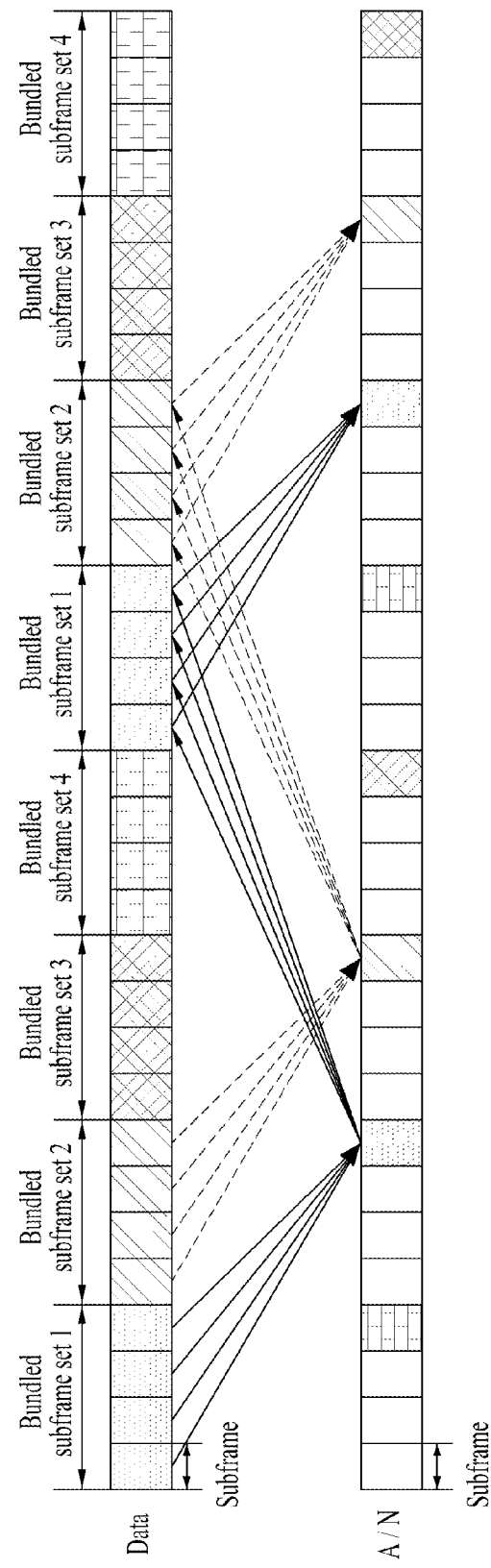

If different data is transmitted in each subframe of the bundled subframes, a HARQ process may be applied as illustrated in FIG. 12 or 13. Since different data is transmitted in each subframe in the bundled subframes, ACK/NACK information for all PDSCHs or PUSCHs transmitted in the bundled subframes is respectively transmitted.

Referring to FIG. 12, in UL, if data is transmitted in each of all or some subframe(s) of four bundled subframes (subframes n−3, n−2, n−1, and n), ACKs/NACKs for the data of subframes n−3, n−2, n−1, and n are respectively transmitted in subframes n+4, n+5, n+6, and n+7. If ACK/NACK information indicates NACK, retransmissions of the data of subframes n−3, n−2, n−1, and n are respectively performed in subframes n+13, n+14, n+15, and n+16. In DL, if data is transmitted in each of all or some subframe(s) of four bundled subframes (subframes n−3, n−2, n−1, and n), ACKs/NACKs for the data of subframes n−3, n−2, n−1, and n are respectively transmitted in subframes n+4, n+5, n+6, and n+7. In other words, ACK/NACK information for data transmitted in subframe n−k (k=0,1,2,3) is transmitted in subframe n-k+7 and retransmission of data transmitted in subframe n-k (k=0, 1, 2, 3) is performed in subframe n-k+16. Accordingly, in FIG. 12, four HARQ processes operate in both DL and UL.

Referring to FIG. 13, in UL, if data is transmitted in each of all or some subframe(s) of four bundled subframes (subframes n−3, n−2, n−1, and n), ACKs/NACKs for the data are bundled and then transmitted in subframe n+4. If ACK/NACK information indicates NACK, retransmissions of the data of subframes n<3, n−2, n−1, and n are respectively performed in subframes n+13, n+14, n+15, and n+16. In DL, if data is transmitted in each of all or some subframe(s) of four bundled subframes (subframes n−3, n−2, n−1, and n), ACKs/NACKs for the data are bundled and then all transmitted in subframe n+4. Accordingly, in FIG. 13, four HARQ processes operate in both DL and UL.

As another example, in UL, if data is transmitted in each of all or some subframe(s) of four bundled subframes (subframes n−3, n−2, n−1, and n), ACKs/NACKs for the data are bundled and then transmitted together and are repeatedly transmitted in subframes n+4, n+5, n+6, and n+7. If ACK/NACK information indicates NACK, retransmissions of the data of subframes n−3, n−2, n−1, and n are respectively performed in subframes n+13, n+14, n+15, and n+16. In DL, if data is transmitted in each of all or some subframe(s) of four bundled subframes (subframes n−3, n−2, n−1, and n), ACKs/NACKs for the data are bundled and then transmitted together and are repeatedly transmitted in subframes n+4, n+5, n+6, and n+7.

Figure 14:
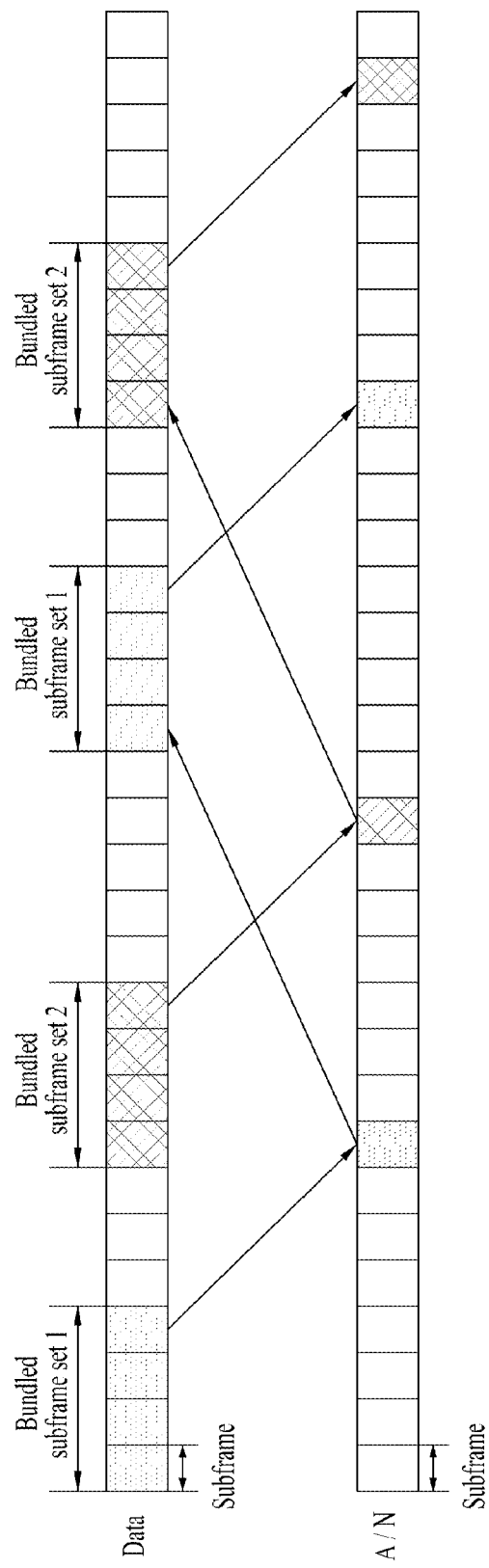

If the first bundled subframe set consists of subframes n−3, n−2, n−1, and n, other bundled subframe sets may be fixed, for example, to bundled subframe sets consisting of subframes {n−3, n−2, n−1, n}, subframes {n+1, n+2, n+3, n+4}, subframes {n+5, n+6, n+7, n+8}, and subframes {n+9, n+10, n+11, n+12} as illustrated in FIGS. 11, 12, and 13. However, if the first bundled subframe set consists of subframes n−3, n−2, n−1, and n, another bundled subframe set may consist of, as illustrated in FIG. 14, arbitrary consecutive subframes among subframes that are not included in the first bundled subframe set. Even in this case, the same methods as the methods described in FIG. 11, 12, or 13 may be applied to an ACK/NACK transmission timing and a retransmission timing.

D. Redundancy Version for Bundled Subframes

Multiple subpackets used for initial transmission and retransmission by a HARQ scheme are generated from one codeword packet. The generated multiple subpackets may be distinguished from each other by the length of a subpacket and the start location of a subpacket. A distinguishable subpacket is referred to as a redundancy version (RV) and RV information means a scheduled start location of each RV.

A transmitting device transmits a subpacket through a data channel during every HARQ transmission. The transmitting device generates an RV of a subpacket for every HARQ transmission in a predetermined order between the transmitting device and a receiving device or arbitrarily generates the RV to transmit RV information through a control channel. The receiving device maps the subpacket received through the data channel to an accurate location of a codeword packet using a predetermined RV order or RV information received through the control channel.

Figure 15:
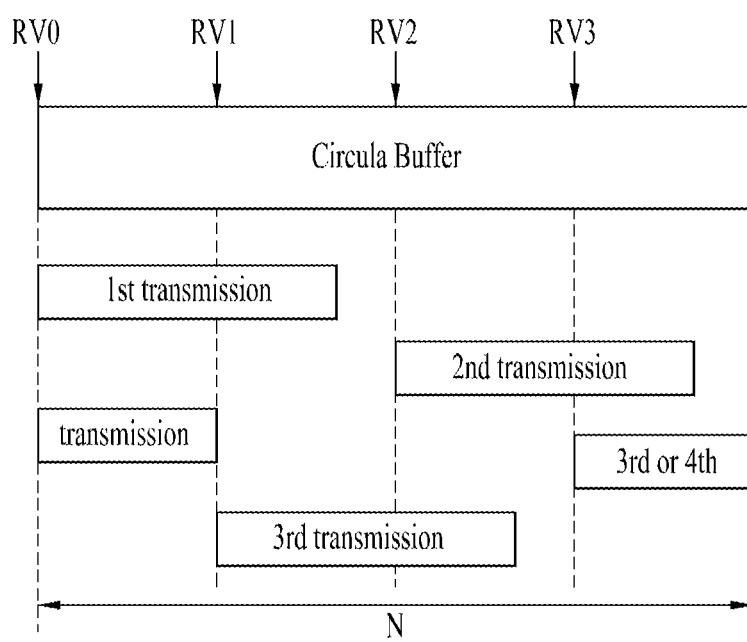
FIG. 15 illustrates HARQ transmission using start locations of four fixed redundancy versions (RVs).

FIG. 15 illustrates HARQ transmission using start locations of four fixed RVs. In FIG. 15, it is assumed that the size of a subpacket used during every HARQ transmission is constant and the size of the subpacket is N/3 under the assumption of a static channel. In FIG. 15, the first transmission refers to a subpacket used for initial transmission by the HARQ scheme and the other transmissions refer to subpackets HARQ-retransmitted three times. In FIG. 15, N denotes the size of a circular buffer.

Figure 16:
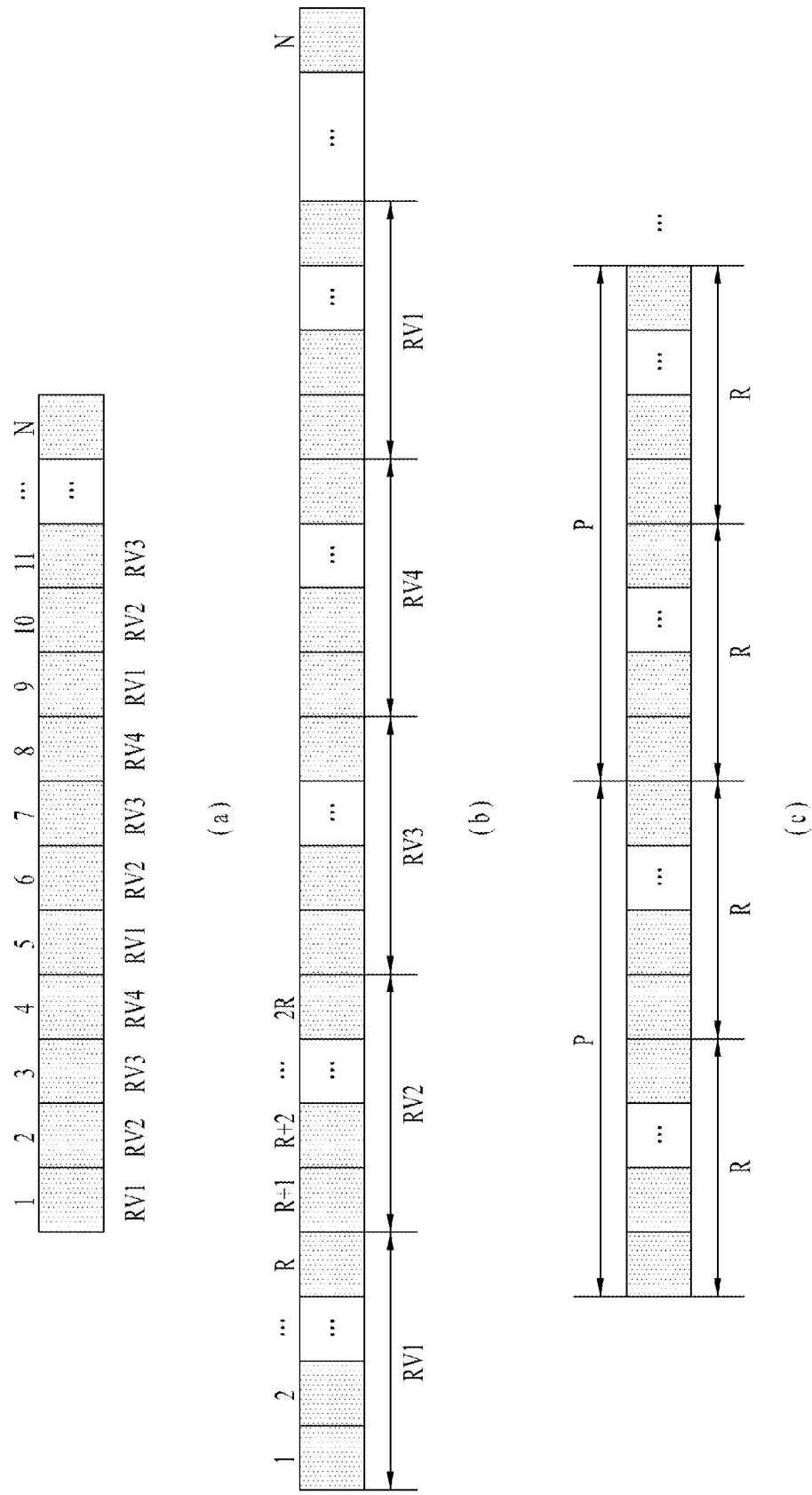
FIG. 16 illustrates an application of an RV for bundled subframes according to embodiments of the present invention.

FIG. 16 illustrates an application of an RV for bundled subframes according to embodiments of the present invention.

According to the present invention, a PDSCH/PUSCH may be repeatedly transmitted in a bundle of multiple subframes in order to provide wider coverage to the UE. For example, the PDSCH may be transmitted in N subframes and the UE may successfully receive the PDSCH using n (1≤n≤N) subframes among N PDSCH subframes. In this case, RV values of the PDSCH/PUSCH repeatedly transmitted in the subframe bundle may have four or multiple RB values alternately used in every subframe as illustrated in FIG. 16(a).

Alternatively, the RV values of the PDSCH/PUSCH repeatedly transmitted in the subframe bundle may have four or multiple RV values which are changed every R subframes as illustrated in FIG. 16(b). If the number of subframes to which the same RV value is applied is R, the value of R may be a predefined fixed value or a value which is configured by the eNB and provided to the UE.

If the same RV value is used in subframes of a specific duration, data consisting of the same bits is transmitted through PDSCHs/PUSCHs of the subframes. In this case, if the UE/eNB adds all the data transmitted through the PDSCHs/PUSCHs and uses the added data for data reception, more effective data reception can be performed. Further, if RS(s) of multiple subframes can be used to receive data, more successful data reception can be performed. To this end, in a DMRS based data transmission environment, the same precoding is applicable during multiple subframes as described in Embodiments A and B of the present invention. Referring to FIG. 16(c), the same precoding may be used during P subframes in a subframe bundle. The value of P may be a predefined fixed value or may be a value which is configured by the eNB and provided to the UE. The UE/eNB may improve data reception performance by performing demodulation after adding data of subframes having the same RV value.

The number P of subframes to which the same precoding is applied and the number R of subframes to which the same RV value is applied may be equally configured. If P and R are equally configured, a precoding diversity effect can be obtained. Alternatively, if the number P of subframes to which precoding is applied is not configured by the eNB and only the number R of subframes to which the same RV value is applied is configured for the UE, the UE may assume that the same precoding is always used in a bundle of consecutive subframes in which the same RV value is used. Alternatively, if a unit/period at which a different RV value is repeated or a spacing between subframes in which the same RV value is applied again (e.g. an interval, from "subframe 1" to "subframe 4R", in which RV1, RV2, RV3, and RV4 are used once in FIG. 16(b)) is defined as an RV cycling period, the UE may assume that the same precoding is used during one RV cycling period or during a duration corresponding to a multiple of the RV cycling period.

Meanwhile, referring to FIG. 8, a rate-matched codeword is subjected to a scrambling procedure before being modulated. For example, bits of a codeword carried by a PUSCH in one subframe are scrambled to a UE-specific scrambling sequence before being modulated and a generator of the scrambling sequence is initialized using a subframe number and an RNTI associated with PUSCH transmission at the start of each subframe. As another example, bits carried by a series of PUCCH format 2 or a series of PUCCH format 3 are scrambled to a UE-specific scrambling sequence and a generator of the scrambling sequence is initialized using a subframe number and a C-RNTI at the start of each subframe. As still another example, bits of a codeword carried by a PDSCH in one subframe are scrambled to a scrambling sequence before being modulated and a generator of the scrambling sequence is initialized using an RNTI associated with the PDSCH at the start of each subframe. Bits carried by a PDCCH, a PCFICH, or a PHICH are scrambled to a UE-specific sequence before being modulated and a generator of the scrambling sequence is initialized using a subframe number and $N^{cell}_{ID}$ at the start of each subframe. The generator of the scrambling sequence used to generate a UE-RS or an EPDCCH DMRS, as described in FIG. 9, may also be initialized using a subframe number at the start of each subframe. Thus, according to standards up to now, since a scrambling sequence applied to a physical channel or a physical signal is initialized using a subframe number at the start of each subframe, the scrambling sequence varies according to the number of bundled subframes.

However, the present invention proposes scrambling a codeword using the same scrambling sequence during a duration of R subframes in which a PDSCH is repeatedly transmitted and to which the same RV value is applied. For example, the UE may receive DL data under the assumption that the same scrambling sequence is used in R consecutive subframes to which the same RV value is applied or may scramble UL data which is to be repeatedly transmitted in R consecutive subframes to which the same RV value is applied by using the same scrambling sequence. The UE may assume that a scrambling sequence used in the R consecutive subframes is the same as a scrambling sequence used in the first subframe among the R consecutive subframes to which the same RV value is applied.

Alternatively, when the PDSCH is repeatedly transmitted and the same precoding is applied to a duration of P subframes, a scrambling sequence for scrambling a codeword may be equally used in the P subframes. For example, the UE may receive DL data under the assumption that the same scrambling sequence is used in P consecutive subframes to which the same precoding is applied or may scramble UL data which is to be repeatedly transmitted in R consecutive subframes to which the same precoding is applied by using the same scrambling sequence.

The present invention proposes that the same precoding, the same scrambling sequence, and/or the same precoding RV be applied to a physical channel or a physical signal transmitted in bundled subframes.

The eNB processor of the present invention may configure a bundle of one or more subframes for UL transmission or DL transmission. The eNB processor may determine whether to configure a subframe bundle set based on a UL and/or DL channel state, transmit power of the UE, distance to the UE from a node controlled by the eNB processor, mobility of the UE, etc. and may configure the number of subframes in the subframe bundle set, a period of the subframe bundle set, and/or an application start/end timing of the subframe bundle set. The eNB processor may cause the eNB RF unit to transmit configuration information of the subframe bundle set. The subframe bundle set may be configured to be identically applied to UL and DL, to be applied only to one of UL and DL, or to be separately configured with respect to UL and DL.

The UE processor controls the UE RF unit to receive the configuration information about the subframe bundle set. If the configuration information is about UL, the UE processor may control the UE RF unit to perform UL transmission in the subframe bundle set according to at least one of the embodiments of the present invention.

For example, in UL, the UE processor may generate a DMRS associated with a physical channel carrying a UL signal so as to have the same sequence over subframes of the subframe bundle set or have a sequence generated using the same cell ID and/or the same scrambling sequence ID. The UE processor may be configured to precode the DMRS by the same precoding matrix over the subframes of the subframe bundle set and cause the UE RF unit to apply the precoded DMRS to multiple subframes of the subframe bundle set. The eNB processor may control the RF unit to receive a physical channel carrying UL data or UL control information in the subframe bundle set. The eNB processor may decode the physical channel under the assumption that a DMRS received in each subframe of the subframe bundle set is precoded by the same precoding matrix. The eNB processor may decode data or control information carried by the physical channel based on the DMRS under the assumption that the DMRS received in multiple subframes of the subframe bundle set has the same DMRS sequence over the multiple subframes or that the DMRS is generated using at least the same cell ID or the same DMRS sequence. The UE processor may control the UE RF unit to receive ACK/NACK information for a data channel transmitted in the bundled subframe set according to any one of timings proposed in embodiment C of the present invention.

As another example, in DL, the UE processor may cause the UE RF unit to receive a DL channel and a DMRS associated with the DL channel in the bundled subframe set. The UE processor may decode a DL signal transmitted over a physical channel under the assumption that the DMRS associated with the physical channel carrying the DL signal is precoded by the same precoding matrix over subframes in the subframe bundle set. The UE processor may decode the DL signal under the assumption that the DMRS has the same sequence over the subframes of the subframe bundle set or has a sequence generated using the same cell ID and/or the same scrambling sequence ID. In other words, the UE processor may decode the DL signal based on the DMRS under the assumption that a precoding matrix applied to the DMRS received in at least the bundled subframe set is the same in the bundled subframe set or that the DMRS has the same sequence in the bundled subframe set or has a sequence generated using the same cell ID and/or scrambling sequence in the bundled subframe set. The UE processor may control the UE RF unit to transmit ACK/NACK information for a data channel received in the bundled subframe set according to any one of ACK/NACK transmission timings proposed in embodiment C of the present invention. The eNB processor may control the eNB RF unit to receive the ACK/NACK information at a corresponding ACK/NACK transmission timing. If the ACK/NACK information indicates NACK, the eNB processor may control the eNB RF unit to retransmit data transmitted in the bundled subframe set according to any one of retransmission timings proposed in embodiment C of the present invention and the UE processor may control the UE RF unit to receive data at the retransmission timing.

Frequency hopping may not be applied in subframes of a bundled subframe set according to the present invention. If a PDCCH is transmitted in each of the subframes of the bundled subframe set, the eNB processor may set a resource assignment field of DCI to indicate that the DCI carried by the PDCCH indicates the same RB(s). In DL, the UE processor may receive DL data under the assumption that RB(s) indicated by DL grant DCI carried by the PDCCH received in the first subframe of the bundled subframe set are applied to all subframes in the bundled subframe set. That is, the UE processor may control the UE RF unit to receive a data channel in the RBs of all subframes in which a PDSCH is scheduled in the bundled subframe set. In UL, the UE processor may control the UE RF unit to transmit a data channel in multiple subframes in the bundled subframe set and control the UE RF unit to transmit the data channel in RB(s) indicated by UL grant DCI carried by the PDCCH in the first subframe of the bundled subframe set.

The eNB of the present invention may apply the same RV value to data repeatedly transmitted in the bundled subframe set. In DL, the UE processor may receive data under the assumption that the data received in each of multiple subframes of the bundled subframe set has the same RV value. In UL, the UE processor may control the UE RF unit to transmit data to which the same RV value is applied in each of multiple subframes in the bundled subframe set.

According to the above-described embodiments of the present invention, decoding performance for data can be improved.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to an eNB, a UE, or other devices in a wireless communication system.

The invention claimed is:

1. A method for transmitting data by a transmitting device, the method comprising:
   applying, by the transmitting device, a redundancy version (RV) to the data;
   scrambling, by the transmitting device, the data; and
   transmitting, by the transmitting device, the data multiple times in N consecutive subframes, where N is a positive integer greater than 1,
   wherein the data is transmitted more than once over R consecutive subframes in the N consecutive subframes, and the RV applied to the data is same over the R consecutive subframes, where R is a predefined positive integer greater than 1,
   wherein the RV applied to the data is changed every R consecutive subframes in the N consecutive subframes, where N is greater than R, and
   wherein the data is scrambled with a same scrambling sequence over the R consecutive subframes for which the RV applied to the data stays the same.

2. The method according to claim 1, further comprising:
   precoding, by the transmitting device, the data,
   wherein the data is precoded using a same precoding matrix across P consecutive subframes within the N consecutive subframes, where P is a positive integer configured by the transmitting device.

3. A method for receiving data by a receiving device, the method comprising:
   receiving, by the receiving device, the data multiple times in N consecutive subframes, where N is a positive integer greater than 1; and
   decoding, by the receiving device, the multiple times received data based on one or more redundancy versions (RVs) for the data and one or more scrambling sequences for the data,
   wherein the data is received more than once over R consecutive subframes in the N consecutive subframes, and the data is decoded using a same RV over the R consecutive subframes, where R is a predefined positive integer greater than 1,
   wherein the RV used for the data is changed every R consecutive subframes in the N consecutive subframes, where N is greater than R, and
   wherein the data is decoded using a same scrambling sequence over the R consecutive subframes for which the RV used for the data stays the same.

4. The method according to claim 3, further comprising:
   receiving, by the receiving device, the data using a same precoding matrix across P consecutive subframes within the N consecutive subframes, where P is a positive integer configured by a transmitting device.

5. A transmitting device for transmitting data, the transmitting device comprising:
   a radio frequency (RF) unit; and
   a processor configured to:
      apply a redundancy version (RV) to the data;
      scramble the data; and
      control the RF unit to transmit the data multiple times in N consecutive subframes, where N is a positive integer greater than 1,
   wherein the data is transmitted more than once over R consecutive subframes in the N consecutive subframes, and the RV applied to the data is same over the R consecutive subframes, where R is a predefined positive integer greater than 1, and
   wherein the RV applied to the data is changed every R consecutive subframes in the N consecutive subframes, where N is greater than R, and
   wherein the processor is configured to scramble the data with a same scrambling sequence over the R consecutive subframes for which the RV applied to the data stays the same.

6. The transmitting device according to claim 5,
   wherein the processor is configured to precode the data using a same precoding matrix across P consecutive subframes within the N consecutive subframes, where P is a positive integer configured by the transmitting device.

7. A receiving device for receiving data, the receiving device comprising:
   a radio frequency (RF) unit; and
   a processor configured to:
      control the RF unit to receive the data multiple times in N consecutive subframes, where N is a positive integer greater than 1, and
      decode the multiple times received data based on one or more redundancy versions (RVs) for the data and one or more scrambling sequences for the data,
   wherein the data is received more than once over R consecutive subframes in the N consecutive subframes, and the data is decoded using a same RV over the R consecutive subframes, where R is a predefined positive integer greater than 1, wherein the RV used for the data is changed every R consecutive subframes in the N consecutive subframes, where N is greater than R, and wherein the data is decoded using a same scrambling sequence over the R consecutive subframes for which the RV used for the data stays the same.

8. The receiving device according to claim 7, wherein the data is received using a same precoding matrix across P consecutive subframes within the N consecutive subframes, where P is a positive integer configured by a transmitting device.

9. The method according to claim 1, further comprising:

scrambling, by the transmitting device, the data with a different scrambling sequence for a subframe, in which a different RV is applied to the data, in the N consecutive subframes.

10. The method according to claim 2, wherein the data is transmitted using a same resource block within the P consecutive subframes.

11. The method according to claim 2, further comprising:

precoding, by the transmitting device, the data using a different precoding matrix for a subframe other than the P consecutive subframes.

12. The method according to claim 3, wherein the data is decoded using a different scrambling sequence for a subframe, in which a different RV is applied to the data, in the N consecutive subframes.

13. The method according to claim 4, wherein the data is received using a same resource block within the P consecutive subframes.

14. The method according to claim 4, wherein the data is decoded using a different precoding matrix for a subframe other than the P consecutive subframes.

15. The transmitting device according to claim 5, wherein the processor is configured to scramble the data with a different scrambling sequence for a subframe, in which a different RV is applied to the data, in the N consecutive subframes.

16. The transmitting device according to claim 6, wherein the processor is configured to control the RF unit to transmit the data using a same resource block within the P consecutive subframes.

17. The transmitting device according to claim 6, wherein the processor is configured to precode the data using a different precoding matrix for a subframe other than the P consecutive subframes.

18. The receiving device according to claim 7, wherein the processor is configured to decode the data using a different scrambling sequence for a subframe, in which a different RV is applied to the data, in the N consecutive subframes.

19. The receiving device according to claim 8, wherein the processor is configured to control the RF unit to receive the data using a same resource block within the P consecutive subframes.

20. The receiving device according to claim 8, wherein the processor is configured to decode the data using a different precoding matrix for a subframe other than the P consecutive subframes.

* * * * *